United States Patent
Butterworth et al.

(10) Patent No.: US 10,167,605 B2
(45) Date of Patent: Jan. 1, 2019

(54) SECURING DEVICE

(71) Applicant: GRIPPLE LIMITED, Sheffield (GB)

(72) Inventors: John Butterworth, South Yorkshire (GB); Martin Baker, South Yorkshire (GB); Neil Clarke, South Yorkshire (GB)

(73) Assignee: Gripple Limited (GB)

( * ) Notice: Subject to any disclaimer, the term of this patent is extended or adjusted under 35 U.S.C. 154(b) by 0 days.

(21) Appl. No.: 15/328,792

(22) PCT Filed: Aug. 5, 2015

(86) PCT No.: PCT/GB2015/000226
§ 371 (c)(1),
(2) Date: Jan. 24, 2017

(87) PCT Pub. No.: WO2016/020631
PCT Pub. Date: Feb. 11, 2016

(65) Prior Publication Data
US 2017/0218593 A1    Aug. 3, 2017

(30) Foreign Application Priority Data

| | | |
|---|---|---|
| Aug. 6, 2014 | (GB) | 1413893.7 |
| Dec. 3, 2014 | (GB) | 1421456.3 |
| Jan. 6, 2015 | (GB) | 1500135.7 |
| Feb. 26, 2015 | (GB) | 1503186.7 |
| Jul. 30, 2015 | (GB) | 1513386.1 |

(51) Int. Cl.
*F16M 13/00* (2006.01)
*E02D 17/20* (2006.01)
*A01G 13/02* (2006.01)
*E02D 5/80* (2006.01)
*A45F 3/44* (2006.01)

(52) U.S. Cl.
CPC ....... *E02D 17/202* (2013.01); *A01G 13/0293* (2013.01); *A45F 3/44* (2013.01); *E02D 5/801* (2013.01)

(58) Field of Classification Search
USPC .......................................................... 248/545
See application file for complete search history.

(56) References Cited

U.S. PATENT DOCUMENTS

| | | | | |
|---|---|---|---|---|
| 90,998 A | * | 6/1869 | Heureuse | D06F 53/00 24/131 R |
| 429,111 A | | 6/1890 | Bailey | |

(Continued)

FOREIGN PATENT DOCUMENTS

| | | |
|---|---|---|
| CA | 2732670 | 3/2011 |
| DE | 7629515 | 12/1976 |

(Continued)

*Primary Examiner* — Monica E Millner
(74) *Attorney, Agent, or Firm* — Clark Hill PLC; James R. Foley

(57) ABSTRACT

A securing device (10) for securing an article is disclosed. The securing device comprises a main shaft portion (14) and a securing portion (20) on the main shaft portion. The securing portion is a substantially helical elongate portion defining a central space (20A). Holding devices (312, 340), drive transmission devices (102, 202) and indicating devices (332) can be used with the securing device.

22 Claims, 22 Drawing Sheets

(56) References Cited

U.S. PATENT DOCUMENTS

| | | | | |
|---|---|---|---|---|
| 781,221 A * | 1/1905 | Morris | | E02D 5/80 |
| | | | | 52/156 |
| 907,799 A * | 12/1908 | Hawley | | E02D 5/801 |
| | | | | 52/157 |
| 1,120,406 A * | 12/1914 | Reach | | E02D 5/80 |
| | | | | 52/156 |
| 1,904,700 A * | 4/1933 | Starks | | A01G 13/0231 |
| | | | | 135/118 |
| 1,916,868 A * | 7/1933 | Starks | | A01G 13/0231 |
| | | | | 403/207 |
| 2,156,021 A * | 4/1939 | Little | | E04H 15/62 |
| | | | | 135/118 |
| 2,251,624 A * | 8/1941 | Foree | | A01G 13/0206 |
| | | | | 135/115 |
| 2,269,996 A * | 1/1942 | Webster | | H01B 17/145 |
| | | | | 174/139 |
| 2,447,444 A * | 8/1948 | Waite | | E02D 5/801 |
| | | | | 47/44 |
| 3,636,670 A * | 1/1972 | Frye | | E02D 5/801 |
| | | | | 52/157 |
| 3,804,409 A * | 4/1974 | Schachner | | A63B 69/0079 |
| | | | | 473/423 |
| 4,432,382 A * | 2/1984 | Wolf | | E04H 15/62 |
| | | | | 119/786 |
| 4,543,972 A | 10/1985 | Bennett et al. | | |
| 4,724,731 A | 2/1988 | Onofrio | | |
| 4,738,062 A * | 4/1988 | Dickey | | A61C 8/0022 |
| | | | | 433/173 |
| 5,943,922 A | 8/1999 | Rolfe | | |
| 5,988,194 A * | 11/1999 | Collins | | E04H 15/62 |
| | | | | 135/118 |
| 6,412,748 B1 * | 7/2002 | Girard | | E04H 12/2215 |
| | | | | 248/530 |
| 6,715,384 B1 | 4/2004 | Kozak | | |
| 2003/0000349 A1 | 1/2003 | Morris | | |

FOREIGN PATENT DOCUMENTS

| | | |
|---|---|---|
| DE | 9316479 | 3/1994 |
| FR | 2696313 | 4/1994 |
| GB | 2116222 | 9/1983 |
| GB | 2356645 | 5/2001 |
| JP | 04-185819 | 7/1992 |
| JP | 2005097840 | 4/2005 |
| JP | 2013-039054 | 2/2013 |
| WO | 2006/102276 | 9/2006 |
| WO | 2013/005098 | 1/2013 |

* cited by examiner

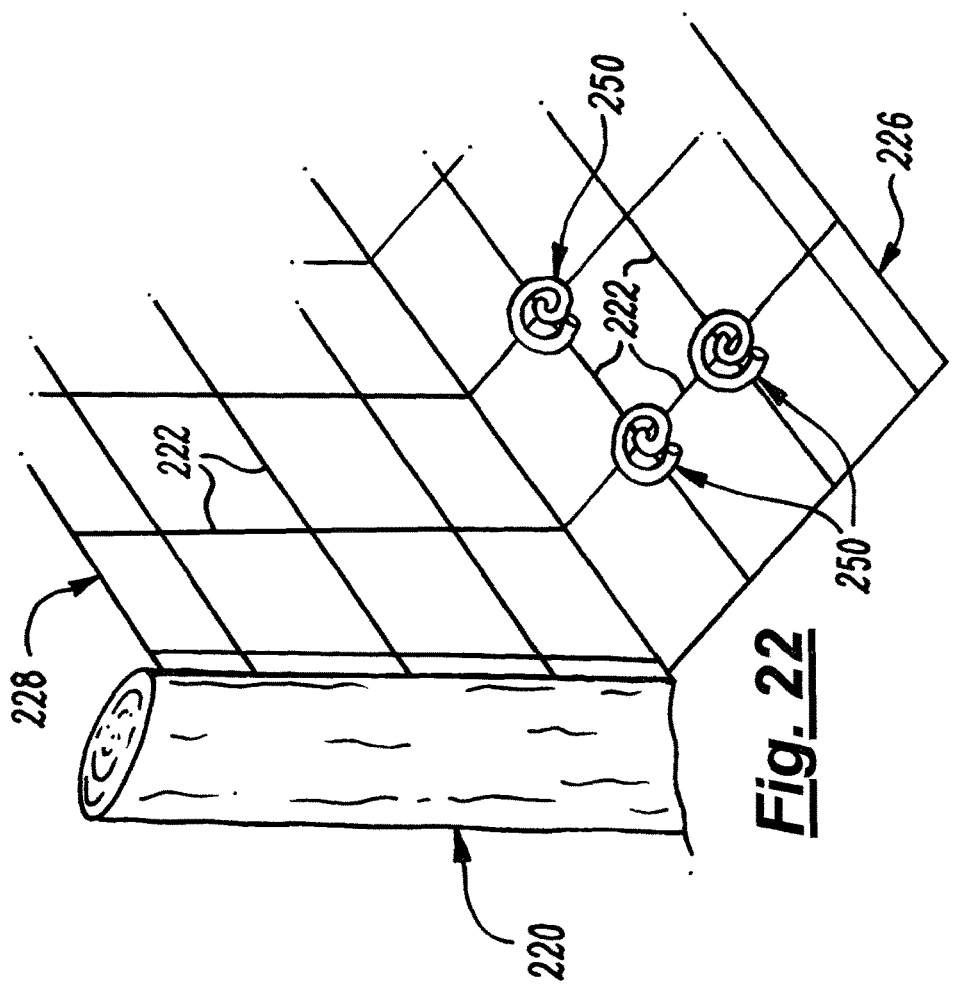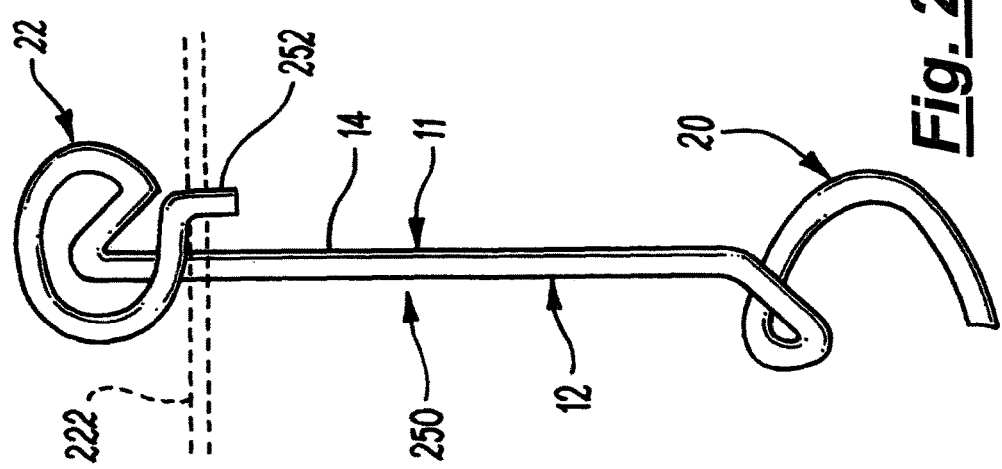

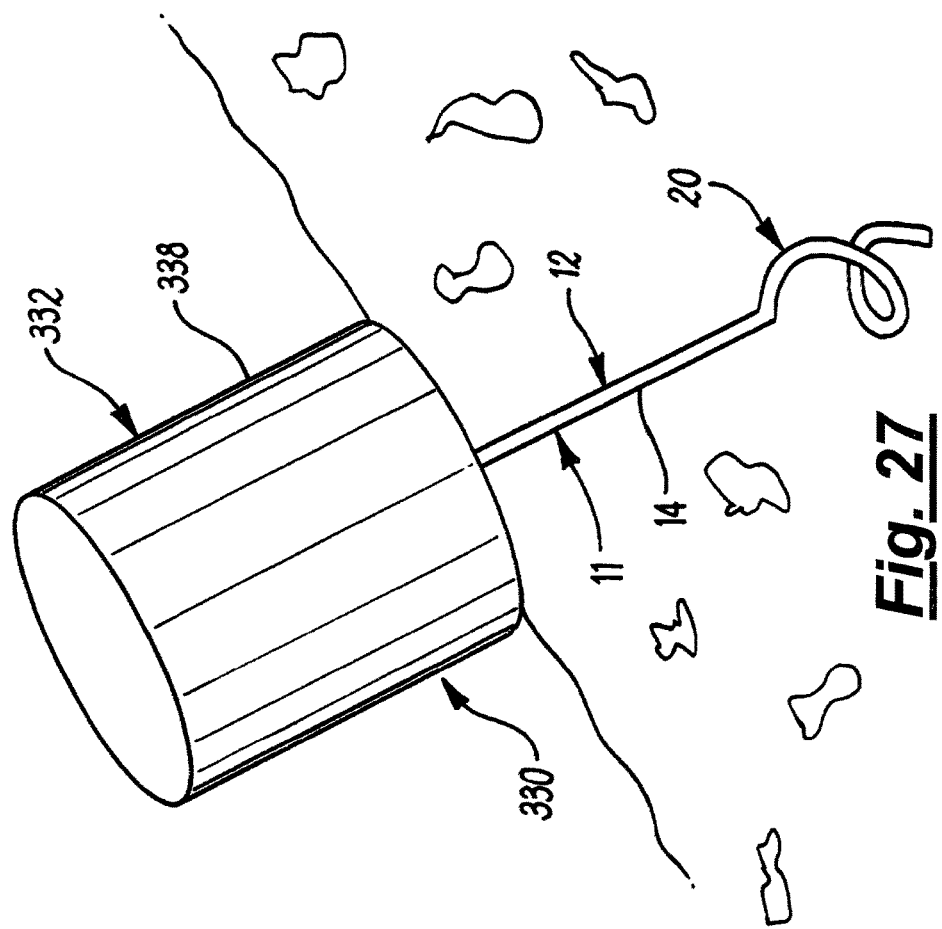
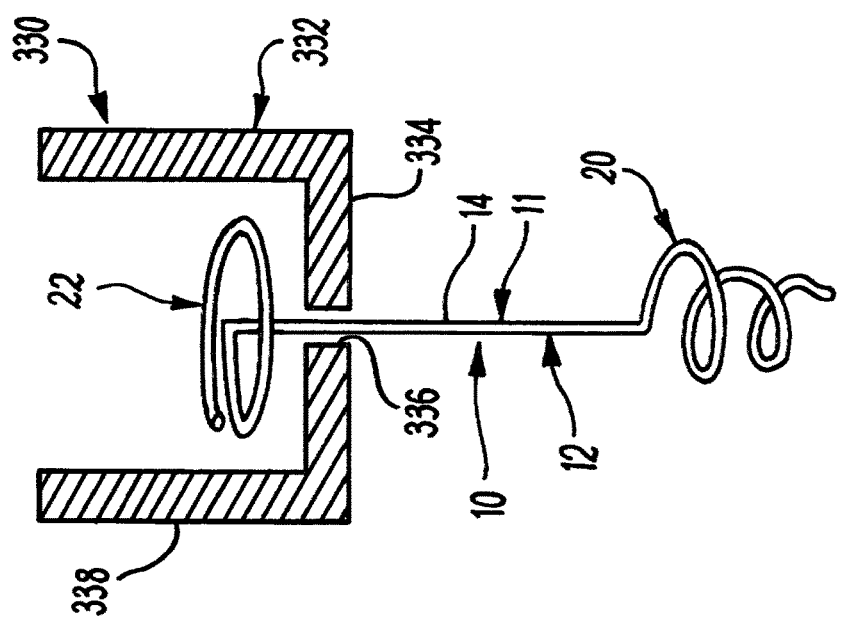

SECURING DEVICE

This invention relates to securing devices. This invention also relates to methods of using securing devices. Embodiments of the invention relate to securing pins and to methods of using securing pins. This invention also relates to erosion control securing devices. This invention also relates to methods of using erosion control securing devices. This invention also relates to securing arrangements incorporating securing pins. More particularly, but not exclusively, this invention relates to erosion control pins and to methods of using erosion control pins. The invention may also relate to drive transmission devices for transmitting driving forces to securing devices. The invention may also relate to securing arrangements comprising securing devices and drive transmission devices. This invention also relates to holding devices and to indicating devices.

It is often necessary to provide some sort of erosion control system on areas of land susceptible to erosion. This can be carried out by laying matting over the area, and securing the matting thereto by the use of securing devices, such as pins, pegs or staples. However, these securing devices can be easily removed, which can lead to failure of the erosion control system.

According to one aspect of this invention, there is provided a securing device for securing an article, the securing device comprising a main shaft portion and a securing portion on the main shaft portion, wherein the securing portion is substantially helical. The securing portion may define a central space around which the securing portion extends.

The securing portion may extend radially beyond the main shaft portion.

The securing portion and the main shaft portion may together comprise an elongate member.

According to another aspect of this invention, there is provided a securing device for securing an article, the securing device comprising an elongate member, the elongate member comprising a main shaft portion and a securing portion on the main shaft portion, wherein the securing portion is substantially helical.

The securing device may comprise a securing pin. The securing device may comprise an erosion control pin.

The securing device may be suitable for securing articles to the ground, such as a substantially flat article or substantially flat portion of an article. The article may comprise a geotextile material or another geotextile article. The securing device may be suitable for securing other articles, such as fencing, to the ground, particularly fencing having a lower region extending flat along the ground. The securing device may be suitable for securing other articles, such as an indicating device, for example a boundary marker or a surveying marker.

According to another aspect of this invention, there is provided an indicating device comprising a base portion in which an aperture is defined, and a projecting portion which projects from the base portion, wherein a securing device can extend through the aperture to secure the indicating device to the ground The indicating device may comprise a base portion in which an aperture is defined through which the securing device can extend, and a projecting portion which projects from the base portion. The base portion may be substantially flat. The base portion may be substantially circular. The projecting portion may be substantially cylindrical or substantially frustoconical. The indicating device may comprise a cup.

The securing device may also be suitable for securing erosion control matting to the ground. The securing device may comprise an erosion control securing device. Desirably, the securing device comprises an erosion control securing pin.

The securing portion may be coaxial with the main shaft portion.

The securing portion may extend over a minor proportion of the length of the elongate member. The main shaft portion may extend over a major proportion of the length of the elongate member.

The securing device may comprise an engaging portion on the main shaft portion. The engaging portion may be configured for engaging the article. The article may comprise an erosion control mat. The securing device may be used to secure other articles, or portions of articles, to the ground. For example, where fencing has a lower region extending flat along the ground, the securing device may be used to secure the lower region to the ground.

The securing device may comprise a mounting member configured for mounting the securing device on a driving arrangement for driving the securing device. The driving arrangement may comprise a driving tool and may further include a drive transmission device for transmitting a driving force from the driving tool to the securing device. The mounting member may be configured for mounting the securing device on the drive transmission device.

The main shaft portion may have proximal and distal opposite ends. The securing portion may be provided at the distal end of the main shaft portion. The engaging portion may be provided at the proximal end of the main shaft portion.

The engaging portion may be substantially planar. The engaging portion may comprise a substantially circular member. The mounting member may be substantially coplanar with the engaging portion. The mounting member may extend inwardly of the engaging portion.

The mounting member may be configured to cooperate with the driving arrangement. The mounting member may comprise a connecting member to connect the engaging portion to the main shaft portion. The mounting member may comprise a substantially straight member.

The securing device may comprise a holding member for holding the article to the ground In one embodiment, the holding member may comprise a substantially axially extending member on the engaging member. In this embodiment, the holding member may be elongate and may extend alongside the shaft. The holding member of this embodiment may extend substantially parallel to the shaft portion. The holding member may be integral with the securing pin. The axially extending member may be integral with the engaging member. The provision of the holding member may render the securing device and the securing arrangement particularly suitable for use with fencing, such as fencing having a lower region extending flat along the ground.

According to another aspect of this invention, there is provided a securing arrangement comprising a securing device as described above and a holding device for holding the article to the ground. The provision of the holding device may render the securing device and the securing arrangement particularly suitable for use with fencing, such as fencing having a lower region extending flat along the ground. The holding device may comprise a first portion, which may define an aperture through which the shaft can extend.

According to another aspect of this invention, there is provided a holding device comprising a first portion, wherein the first portion defines an formation through which the shaft can extend. The formation may be an aperture.

When the securing arrangement includes the holding device of this embodiment, the engaging portion may engage the holding device.

The first portion may cover a part of the article in use.

The holding device may further include a skirt element extending from the first portion. The skirt element may extend substantially wholly around the first portion. The first portion may be substantially flat. The first portion may be substantially circular. The skirt element may be substantially cylindrical.

The skirt element may have a free edge, which may define at least one recess configured to extend over a part of the article in use. The free edge of the skirt element may define a plurality of recesses spaced from one another around the skirt element, each being configured to extend across a respective part of the article.

Alternatively, the holding device may comprise a first portion for receiving the main shaft portion therethrough. The holding device may further include a second portion extending transverse to the first portion. The second portion may extend substantially at right angles to the first portion. The holding device may comprise two of the aforesaid second portions, which may be provided opposite each other on the first portion. The first portion may extend between the two second portions.

The first portion may comprise a first formation through which the shaft can extend. In one embodiment, the first formation may be a first slot defined by the first portion. The first slot may be substantially 'L' shaped, and may extend from an edge of the first portion to allow the main shaft portion to be received therein via said edge. The first portion may be substantially flat. The securing device may extend through the first portion to hold the holding device on the ground.

The, or each, second portion may be substantially flat. The, or each, second portion may comprise a second formation in which the article can be received thereby holding the article at a desired distance from the ground in a first orientation of the holding device. In one embodiment, the, or each, second formation may be a second slot defined by the respective second portion. The, or each, second slot may extend from an edge of the respective second portion.

The, or each, second portion may have a free end. The, or each, second slot may extend from said edge towards a free end of the second portion. The, or each, second slot may have a dogleg shape. When the holding device is in the first orientation, the securing device may secure the holding device to the ground in a position so that the second portion extends upwardly from the ground.

The, or each, second portion may comprise a ground piercing formation. The, or each, second portion may be configured to be inserted into the ground in a second orientation of the holding device. When the holding device is in the second orientation, the first portion may engage article between the first portion and the ground. When the holding device is in tie second orientation, the first portion may engage the article between the two second portions. When the holding device is in the second orientation, the securing device may secure the holding device to the ground in a position so that the second portion extends into the ground.

The, or each, ground piercing formation may comprise a tapered or pointed free end to facilitate being inserted into the ground.

In a further embodiment of the holding device, the first portion may comprise a spiral region through which the shaft may extend. The first portion may be formed of an elongate member deformed into said spiral region. The spiral region may comprise a wound region of the first portion.

In the second embodiment, the, or each, second portion may have hook formations at the free end thereof for receiving the article, thereby holding the article at said desired distance from the ground. Where the holding device has two of the second portions, the hook formations may extend in opposite directions from the second portions.

The further embodiment of the holding device may be formed of an elongate member, such as a wire.

According to another aspect of this invention, there is provided an indicating arrangement comprising a securing device as described above and an indicating device, the indicating device defining an aperture through which the securing device can extend.

The securing device may extend through the aperture in the indicating device to secure the indicating device to the ground. The indicating device may comprise a base portion in which the aperture is defined, and a projecting portion which projects from the base portion.

The base portion may be substantially flat. The base portion may be substantially circular. The projecting portion may be substantially cylindrical or substantially frustoconical. The indicating device may comprise a cup.

According to another aspect of this invention, there is provided a method of using a securing device as described above, said method comprising inserting the securing portion through an article on the ground, and driving the securing device into the ground by rotating the securing device about the main shaft portion.

The article may comprise erosion control matting, and the method may be a method of securing erosion control matting to the ground.

The step of driving the securing device into the ground may be continued until the engaging portion engages the article. Where the holding device comprise a cover through which the shaft can extend, the step of driving the securing device into the ground may comprise driving the securing device so that the shaft moves through the holding device. The method may comprise arranging the holding device so that the, or each, recess extends across a respective part of the article and effecting engagement between the engaging portion and the cover of the holding device.

Where the holding device comprises an axially extending member, the step of driving the securing device into the ground may comprise driving the securing device until the holding device is driven into the ground.

The method may include mounting the securing device on a driving arrangement. The step of mounting the securing device on the driving arrangement may comprise arranging the securing device on a drive transmission device to transmit a driving force from the driving arrangement. The drive transmission device may be mountable on the driving arrangement.

According to another aspect of this invention, there is provided a securing arrangement comprising a securing device as described above and a drive transmission device for transmitting a driving force from a driving arrangement to the securing device.

The drive transmission device may comprise a receiving portion for receiving at least part of the securing device. The drive transmission device may comprise a connecting member for connecting the drive transmission device to the driving tool.

According to another aspect of this invention, there is provided a drive transmission device for transmitting a driving force from a driving tool to a securing device as described above, said drive transmission device comprising a connecting member for connecting the drive transmission device to the driving tool and a receiving portion for receiving at least part of the securing device.

The receiving portion may be configured to receive the mounting member.

The receiving portion may define a recess for receiving the mounting member. The receiving portion may have an end face and the recess may have an opening in the end face. The recess may extend axially inwardly from the end face.

The recess may be a rectangular recess, and may be defined by substantially parallel opposite walls of the receiving portion. The recess may have substantially rectangular side and end profiles.

In a first embodiment, the connecting member may be cylindrical for connecting to a chuck of the driving tool. A frustoconical portion may extend between the connecting member and the receiving portion.

In a second embodiment, the recess may extend axially inwardly from an end opening in the end face of the receiving portion. The recess may extend radially outwardly from a central region of the receiving portion to a side opening in a side of the receiving portion.

The receiving portion may comprise a force transmission wall for engaging the securing device. The force transmission wall may extend axially from said end opening. The force transmission wall may extend radially outwardly from a central region of the receiving portion to said side opening. Desirably, the force transmission wall can engage the mounting member to transmit the driving force to the securing device. The force transmission wall may be one of said walls of the recess.

In use, the drive transmission device is rotated by the drive arrangement so that the force transmission wall engages the mounting member to rotatably urge the securing device, thereby driving the securing portion into the ground. During such rotation, the mounting member moves along the force transmission wall to exit from the recess via the end opening. This provides the advantage in the embodiment described herein that the securing device is released from the drive transmission device when the securing device is driven into the ground. A further advantage provided by the embodiment described herein is that the securing device is driven into the ground to a position where the engaging portion is flush with the ground.

The receiving portion may have a support formation for supporting the securing device when the mounting member is received in the recess. The support formation may comprise a support surface.

The support formation may be provided opposite said force transmission wall. The support formation may extend transverse to said force transmission wall. The receiving portion may comprise a second wall opposite said force transmission wall. The second wall may be one of said walls of the recess.

The support formation may extend from said second wall. The support formation may be arranged transverse to said second wall. The support formation may be substantially orthogonal to said second wall. The support formation provides the advantage in the second embodiment that when the mounting member is received in the recess, the mounting member can be supported on the support formation and, thereby, the securing device may be supported by the drive transmission device.

The drive transmission device may comprise a sleeve extending over the receiving portion. The sleeve may hold the engaging portion of the securing device to prevent the engaging portion uncoiling. The sleeve may define an open end through which the engaging portion of the securing device can be can be received by the receiving portion of the drive transmission device. The sleeve may have an opposite end and a cover extending across the opposite end. The cover may define an aperture through which the connecting member can extend.

Embodiments of the invention will now be described with reference to the accompanying drawings, in which:

FIG. 21 shows a further embodiment of a securing device;

FIG. 22 shows an article in the form of fencing secured by a plurality of the securing devices shown in FIG. 21;

FIG. 26 is a sectional view of an indicating arrangement comprising a securing device and an indicating device;

FIG. 27 shows the indicating arrangement in use;

Figure 1:
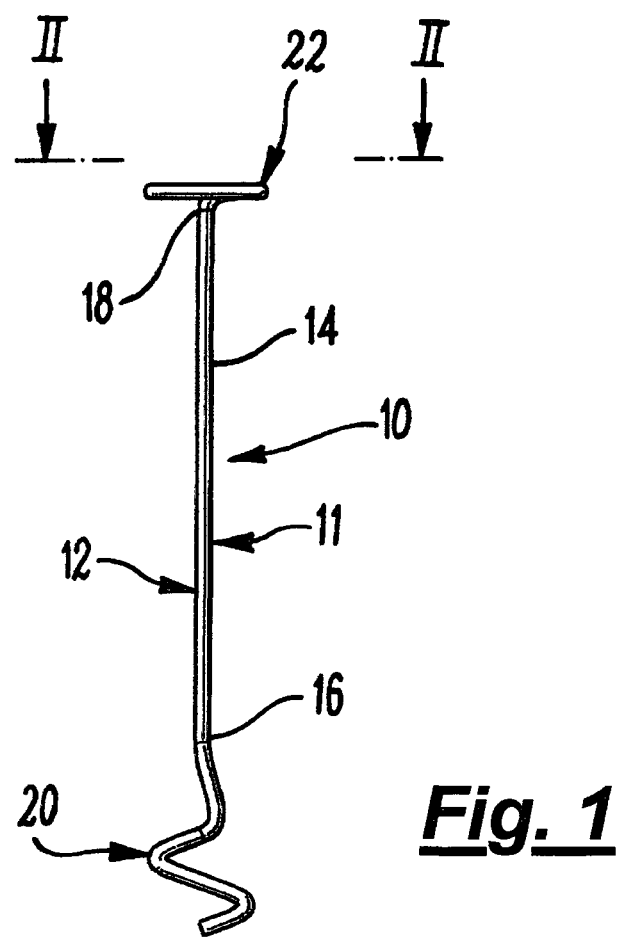
FIG. 1 is a side view of a securing device.
Figure 2:
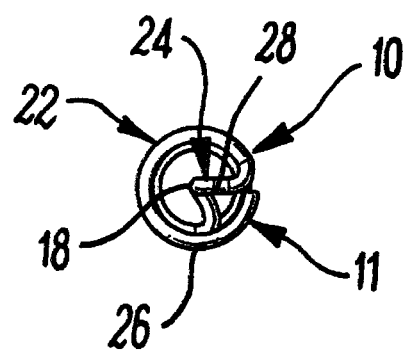
FIG. 2 is a view along the lines II-II in FIG. 1.

FIGS. 1 to 4 show a securing device 10 comprising a securing pin 11. In at least one embodiment described herein, the securing device 10 comprises an erosion control securing pin for securing an article in the form of geotextile matting 100 (see FIGS. 3 and 4) to the ground 101 to reduce erosion of the ground 101. However, it will be appreciated by the skilled person that the securing device 10 could be used to secure other products to the ground, for example, fences, other geotextile materials or geotextile articles, or indicating devices The securing device 10 is formed as one piece and comprises an elongate member 12 comprising a main shaft portion 14 having distal and proximal ends 16, 18. The securing device 10 further includes a securing portion 20 formed at the distal end 16 of the main shaft portion 14. An engaging portion 22 and a mounting member 24 are formed at the proximal end 18 of the main shaft portion 14.

The securing portion 20 is substantially helical to allow the securing device 10 to be screwed into the ground. The securing portion 20 defines a central space 20A (see FIG. 7) around which the securing portion 20 extends. The securing portion 20 extends radially outwardly from the main shaft portion 14. The securing portion 20 and the main shaft portion 14 are coaxial with each other.

The securing portion 20 extends a minor proportion of the length of the elongate member 12. In the embodiment shown, the length of the securing portion 20 along the elongate member 12 is about 20% of the length of the elongate member 12. This provides an advantage in the embodiment described herein that any attempt to remove the securing device 10, by simply pulling it out of the ground, will create an upward force from the securing portion 20 against a frustum of soil above the securing portion 20, thereby requiring a greater force to remove the securing device 10 than prior art pins.

Figure 3:
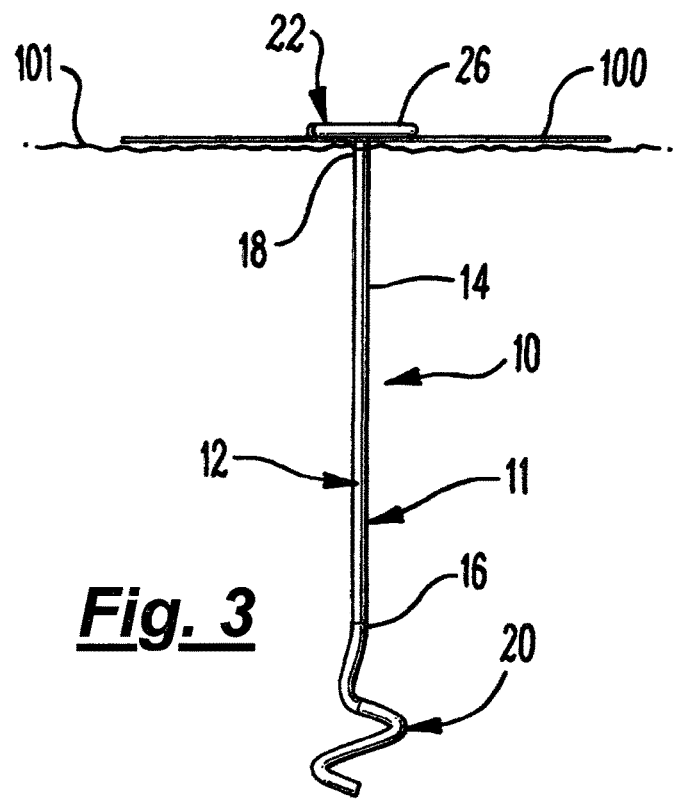
FIG. 3 is a side view of the securing device in use.
Figure 4:
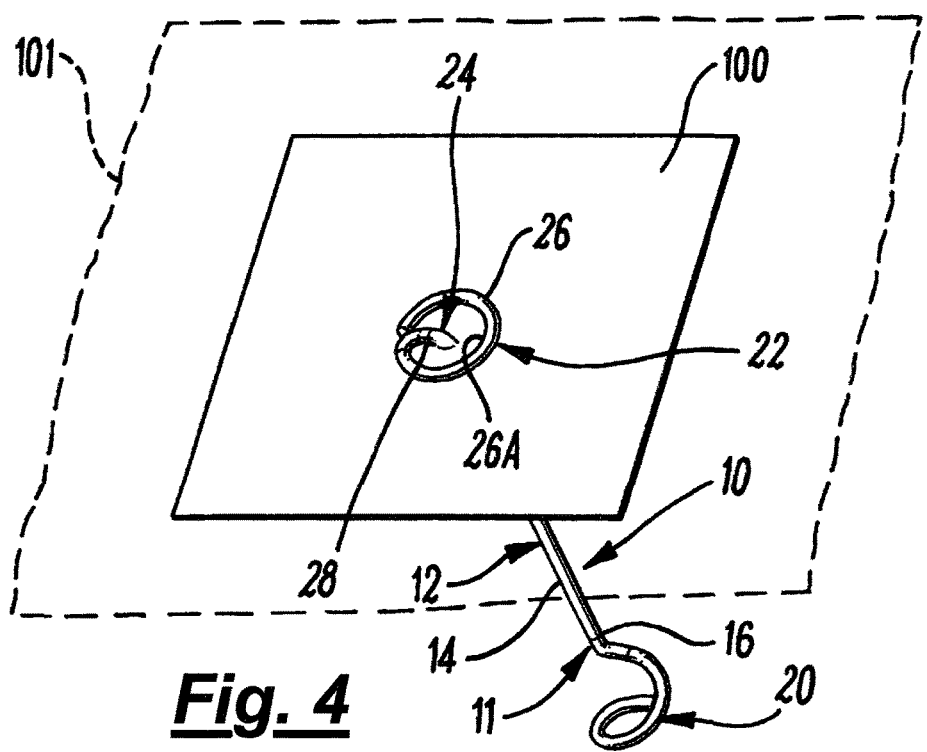
FIG. 4 shows the securing device inserted through an article.
Figure 5:
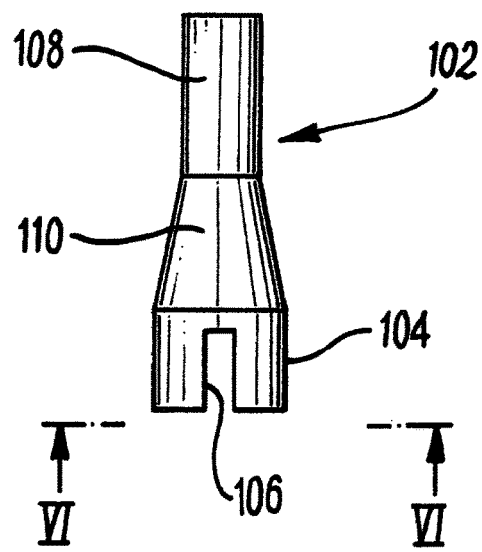
FIG. 5 is a side view of a first embodiment of a drive transmission device for use with the securing device.
Figure 6:
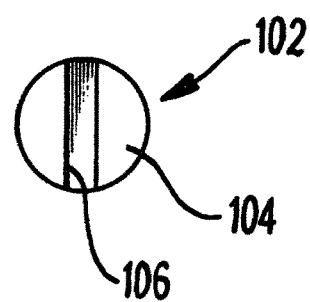
FIG. 6 is a view along the lines VI-VI in FIG. 5.

Referring to FIGS. 3 and 4, the securing device 10 is shown in use with a region of the matting 100. It will be appreciated by those skilled in the art that the region of the matting 100 shown in FIGS. 3 and 4 is only a small part of the matting 100, and that it extends over a much larger area of the ground 101. The ground 101 is represented by a broken line in FIG. 4, so that the elongate member 12 can be seen.

The engaging portion 22 at the proximal end 18 of the elongate member 12 engages the matting 100 when the securing device 10 has been driven a sufficient distance into the ground 101. As the securing device 10 is driven into the ground 101, the engaging portion 22 urges the matting 100 against the ground 101, thereby securing the matting 100 to the ground 101.

As indicated above, the matting 100 extends over a much larger area than shown in FIGS. 3 and 4. In view of this, the use of a plurality of the securing pins 10 may be required.

Referring again to FIG. 2, a top view of the securing device 10 is shown, depicting the engaging portion 22 and the mounting member 24. The engaging portion 22 comprises a circular member 26 defining a further central space 26A. The mounting member 24 comprises a substantially straight attaching member 28 attaching the engaging portion 22 to the main shaft portion 14.

Referring to FIGS. 5 to 8, the mounting member 24 is provided to mount the securing device 10 on a drive arrangement comprising a drive transmission device 102 and a driving tool (not shown). The driving tool can be any suitable known hand operated drill.

Figure 7:
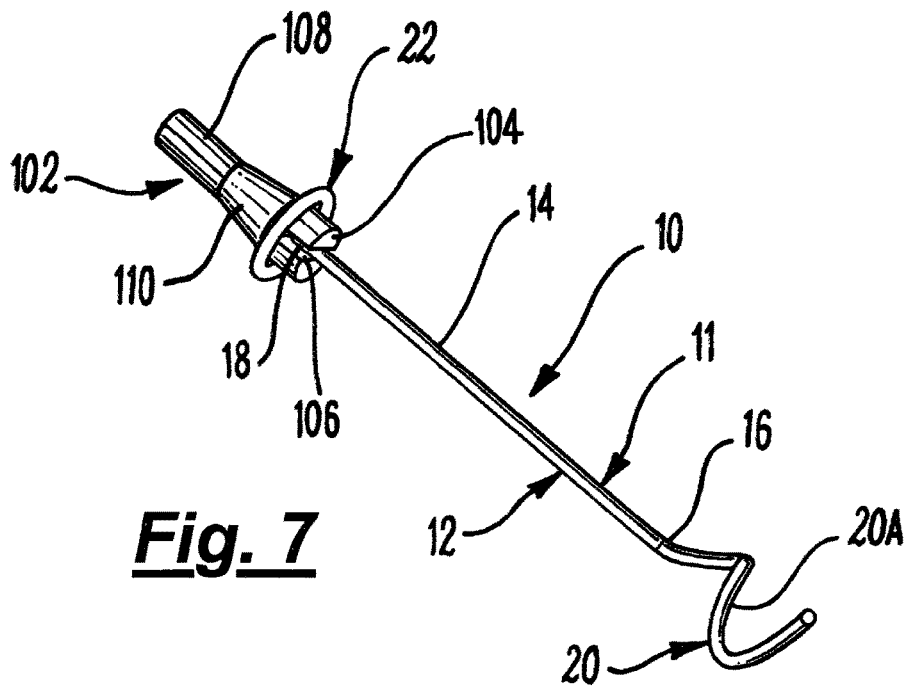
FIG. 7 is a perspective view from below of the securing device mounted on the drive transmission device.
Figure 8:
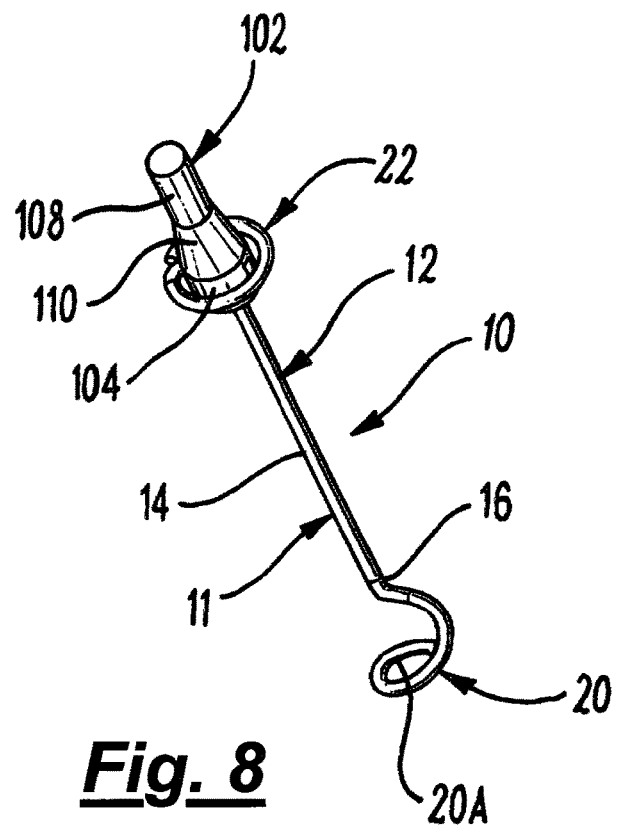
FIG. 8 is a perspective view from above of the securing device mounted on the drive transmission device.
Figure 9:
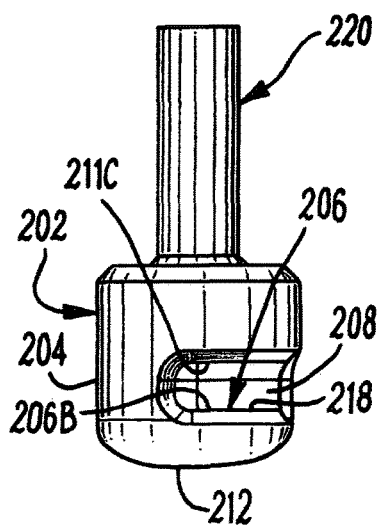
FIG. 9 is a view in a first direction of a second embodiment of the drive transmission device.
Figure 10:
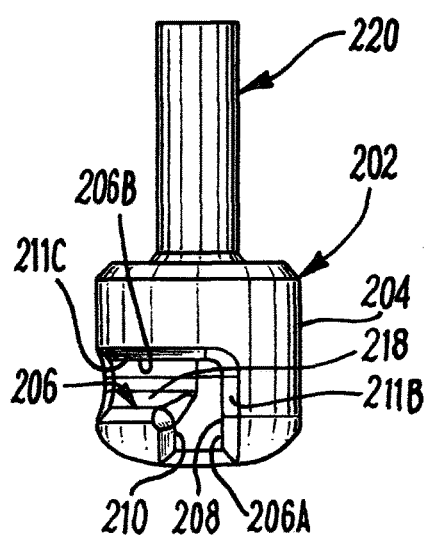
FIG. 10 is a view in a second direction transverse to the first direction of the second embodiment of the drive transmission device.
Figure 11:
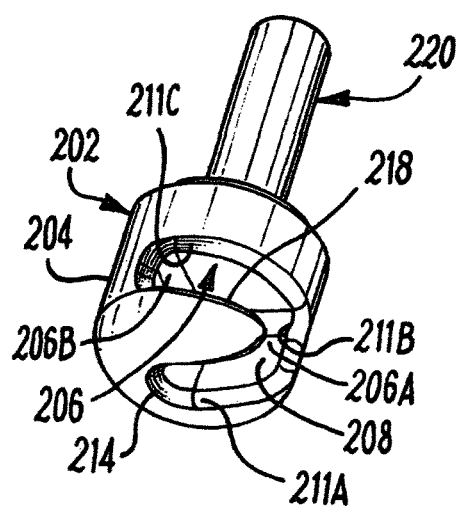
FIG. 11 is a perspective view from below of the second embodiment of the drive transmission device.
Figure 12:
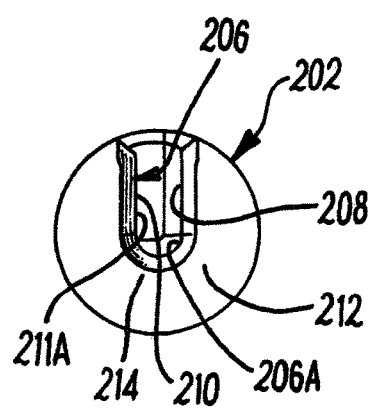
FIG. 12 is a bottom view of the second embodiment of the drive transmission device.

The drive transmission device 102 comprises a receiving portion 104 for receiving the mounting member 24 of the securing device 10. The receiving portion 104 defines a rectangular recess 106, in which the mounting member 24 can be received. When the mounting member 24 is received in the recess 106, the receiving portion 104 is received by the engaging portion 22, as shown in FIGS. 7 and 8. This has the advantage, in the embodiments described herein, of stabilising the securing device 10 on the drive transmission device 102.

The drive transmission device 102 also includes a connecting member 108 for connecting the drive transmission device 102 to the driving tool. The connecting member 108 is substantially cylindrical and can be received by a standard chuck of a hand operated drill.

A frustoconical portion 110 extends between the connecting member 108 and the receiving portion 104.

In use, the drive transmission device 102 is connected to the hand operated drill in a manner that would be understood by those skilled in the art. The securing device 10 is mounted thereon by inserting the mounting member 24 into the recess 106 of the receiving portion 104, so that the receiving portion is received by, and extends through, the engaging portion 22.

While so mounted on the drive transmission device 102, the securing portion 20 is disposed against the matting to be secured to the ground. The user then operates the drill, thereby rotating the securing device 10 about the main shaft portion 14. By pressing down on the drill, the securing device 10 is screwed into the ground until the engaging portion 22 engages the matting 100. The driving tool can then further drive the securing device 10 to urge the matting 100 into tighter engagement with the ground 101, thereby securing the matting 100 to the ground 101.

FIGS. 9 to 20 show a further embodiment of a drive transmission device generally designated 202. The drive transmission device 202 comprises a receiving portion 204 for receiving the mounting member 24 of the securing device 10. The receiving portion 204 defines a generally 'L' shaped recess 206, in which the mounting member 24 can be received.

The recess 206 has a main region 206A, which is defined by a force transmission wall 208 and a second wall 210 opposite the force transmission wall 208. The main region 206A extends axially from an end opening 211A in an end face 212 of the receiving portion 204. The main region 206A of the recess 206 and the end opening 211 extend radially outwardly from a central region 214 of the receiving portion 204. The main region 206A also has an axially extending side opening 211B.

The recess 206 also has a support region 206B, which extends laterally from the main region 206A in a side of the receiving portion 204. The support region 206B of the recess 206 has a support formation in the form of a support surface 218 which extends from the second wall 210 transverse thereto. The support region 206B of the recess 206 extends radially inwardly from a laterally extending side opening 211C. The laterally extending side opening 211C extends laterally relative to the axially extending opening 211B.

Figure 13:
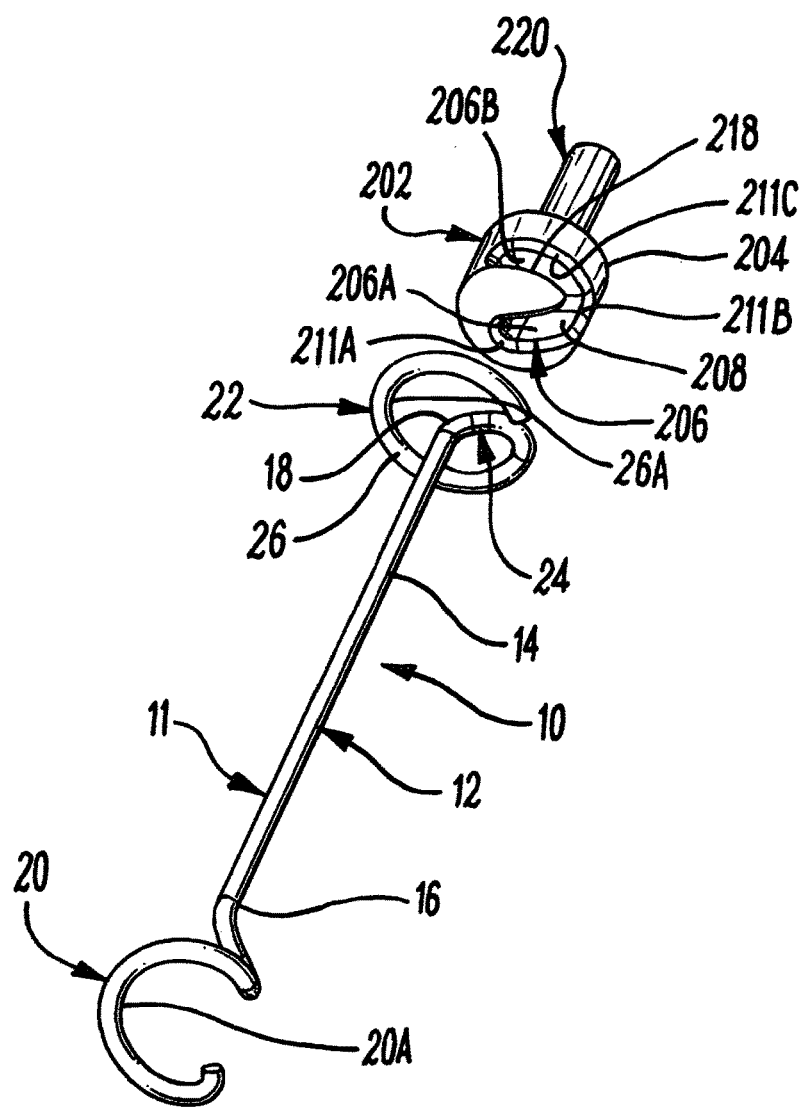
FIG. 13 shows the securing device about to be mounted on the second embodiment of the drive transmission device.
Figure 14:
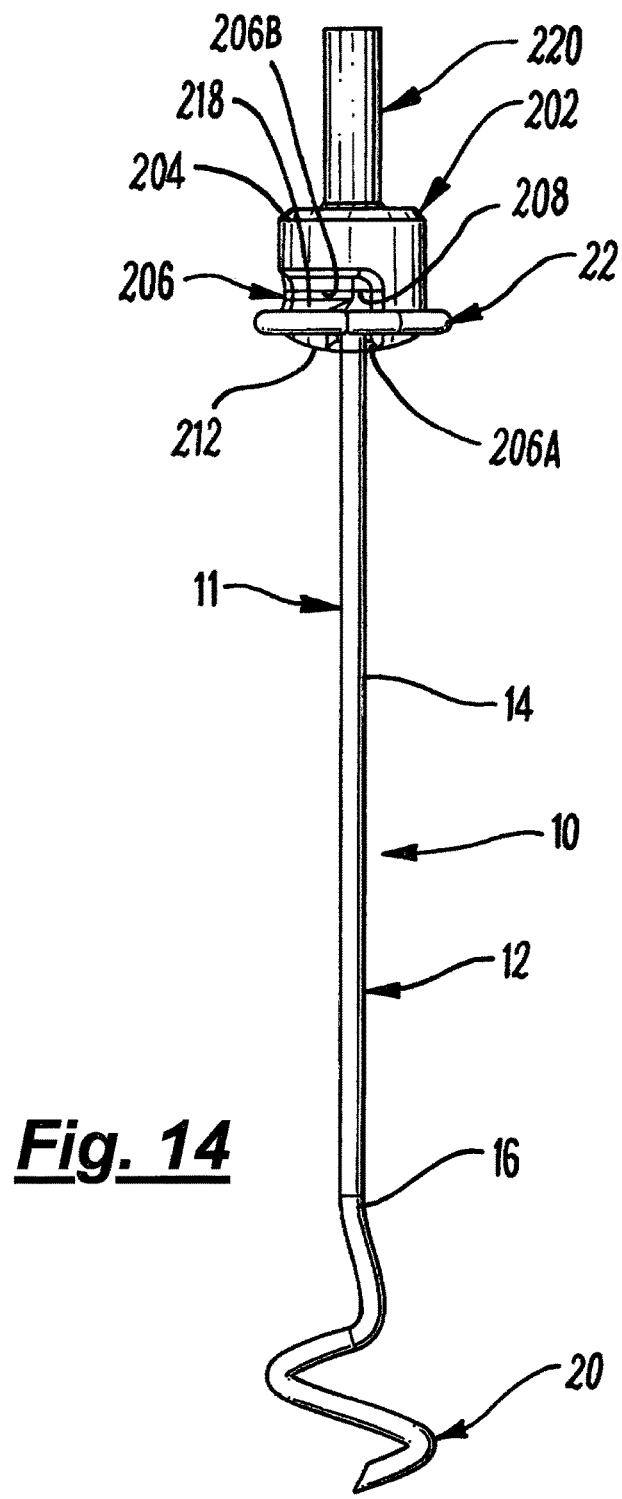
FIG. 14 shows the securing device being mounted on the second embodiment of the drive transmission device.
Figure 15:
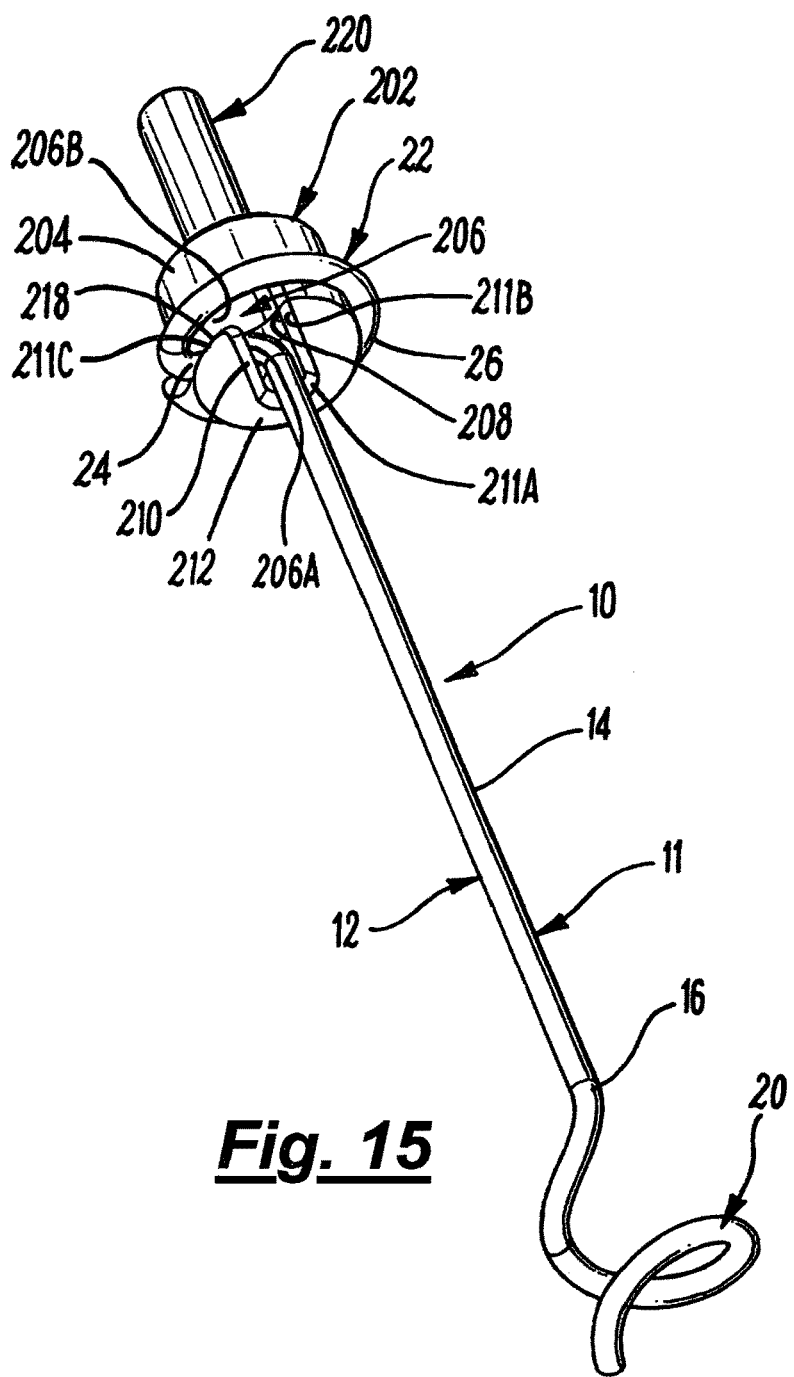
FIG. 15 shows the securing device mounted on the second embodiment of the drive transmission device, in which the drive transmission device is in a driving position relative to the securing device.

FIGS. 13 to 15 show the mounting of the securing device 10 on the drive transmission device 202. The mounting member 24 is received in the support region 206B of the recess 206. When so received, the mounting member 24 engages the support surface 218 to be supported by the support surface 218. Thus, the securing device 10 can be carried by the drive transmission device 202 when the mounting member 24 is supported by the support surface 218.

When the mounting member 24 is received in the recess 206, the receiving portion 104 is received by the engaging portion 22, as shown in FIGS. 14 and 15. this provides the advantage, in the embodiments described herein, of stabilising the securing device 10 on the drive transmission device 202.

Figure 16A:
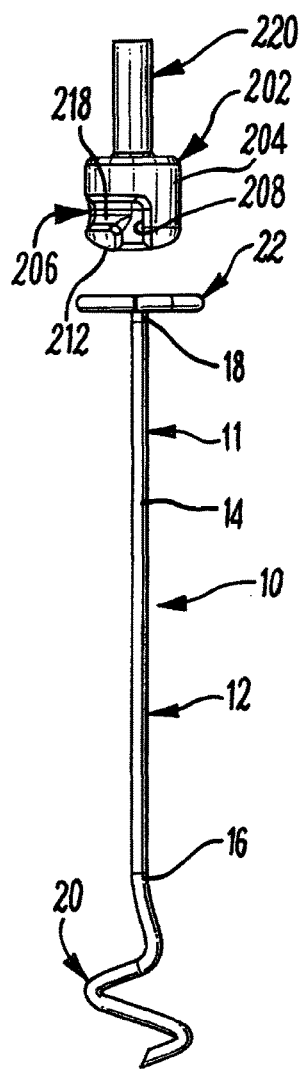
FIGS. 16A to 16C show the arrangement of the securing device on the drive transmission device.
Figure 16B:
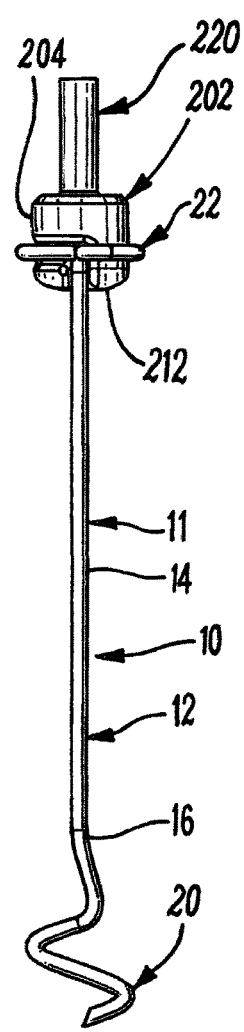
Figure 16C:
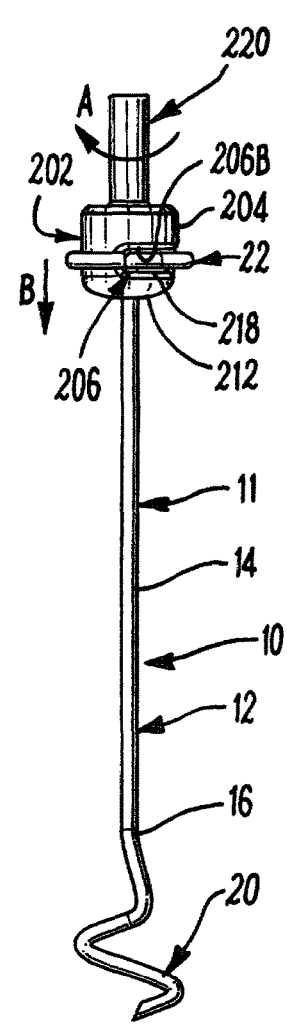

FIGS. 16A to 16B show the arrangement of the securing device 10 on the drive transmission device 202 and the driving of the securing device 10. In FIG. 16A, the drive transmission device 202 and the securing device 10 are shown separate from each other. FIG. 16B shows the drive transmission device 202 in engagement with the securing device 10 after the mounting member 24 has been received in the recess 206. In this position, the force transmission wall 208 is in engagement with the mounting member 24 and can thereby rotatably drive the securing device 10. FIG. 16C shows the rotation of the drive transmission device 202 in the direction indicated by the arrow A to drive the securing device 10 into the ground in the direction indicated by the arrow B.

The drive transmission device 202 also includes a connecting member 220 for connecting the drive transmission device 202 to the driving tool. The connecting member 220 is in the form of an elongate member which may be substantially cylindrical or have a hexagonal profile. The connecting member can be received by a chuck of a standard hand operated drill.

Figure 17:
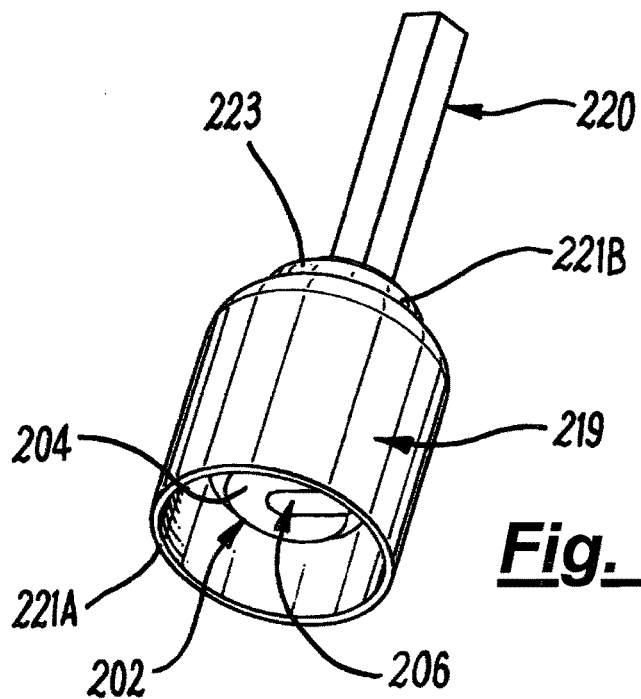
FIG. 17 shows a modified version of the second embodiment of the drive transmission device.
Figure 18:
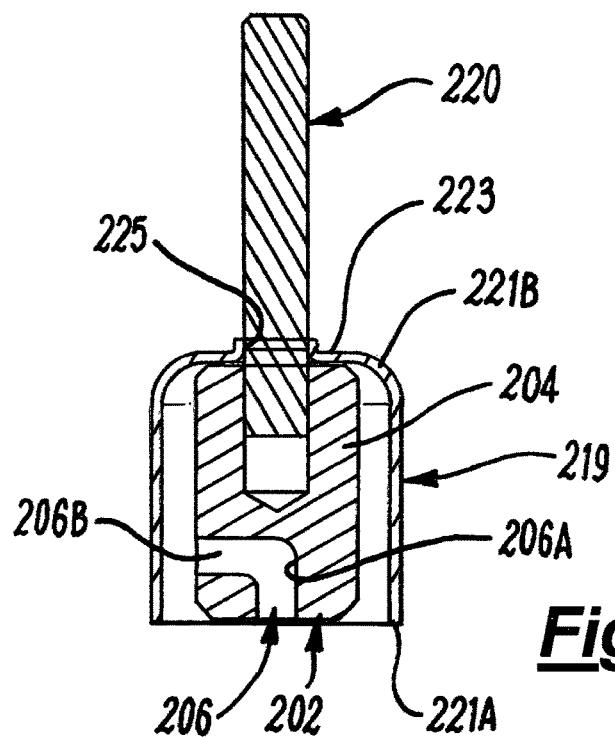
FIG. 18 is a sectional view of the drive transmission device shown in FIG. 17.

FIGS. 17 and 18 show a sleeve 219 provided around the receiving portion 204. The sleeve 219 defines an open end 221A through which the engaging portion 22 of the securing device 10 can be received. The sleeve has an opposite end 221B having a cover 223 extending across the receiving portion 204. The cover defines an aperture 225 through which the connecting member 220 extends.

Where the ground is hard, the rotational force applied by the drive transmission device 202 tends to uncoil the engaging portion 22, which has the effect of making it difficult to drive the securing device 10 into the ground. The sleeve 219 has the effect of holding the engaging portion 22 to prevent the engaging portion 22 from uncoiling.

Figure 19:
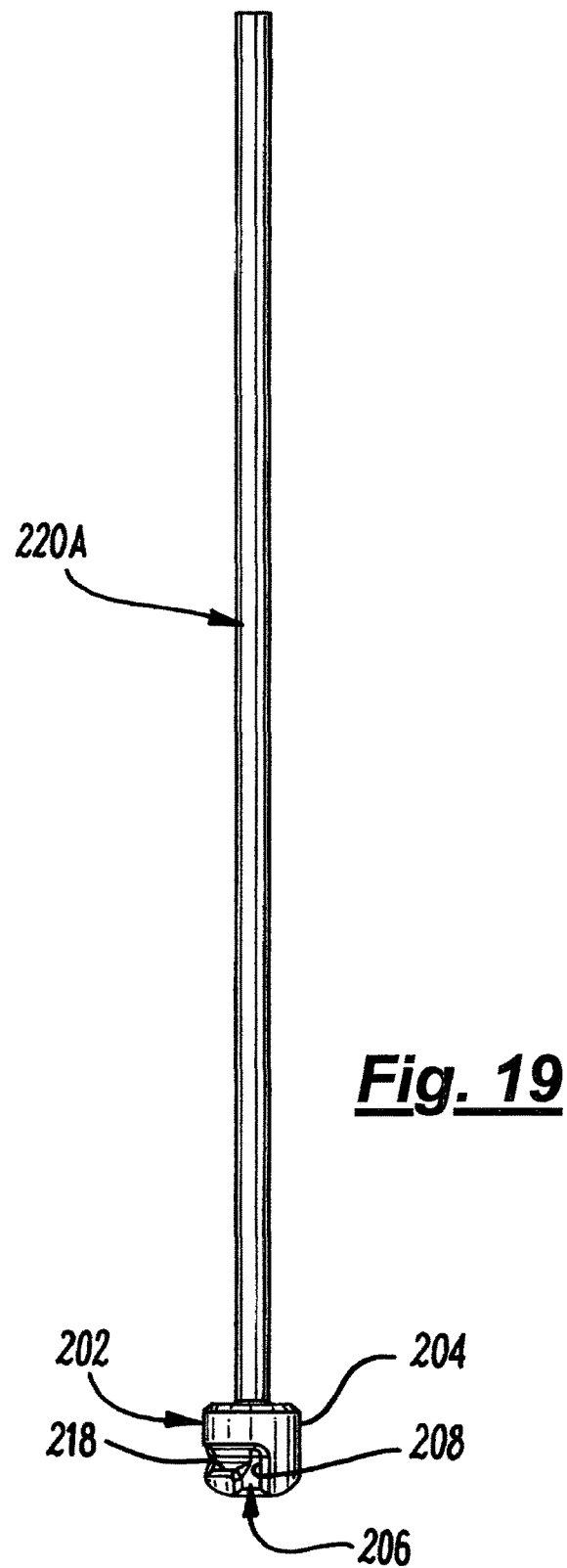
FIG. 19 shows a further version of the second embodiment of the drive transmission device with a long connecting member.
Figure 20:
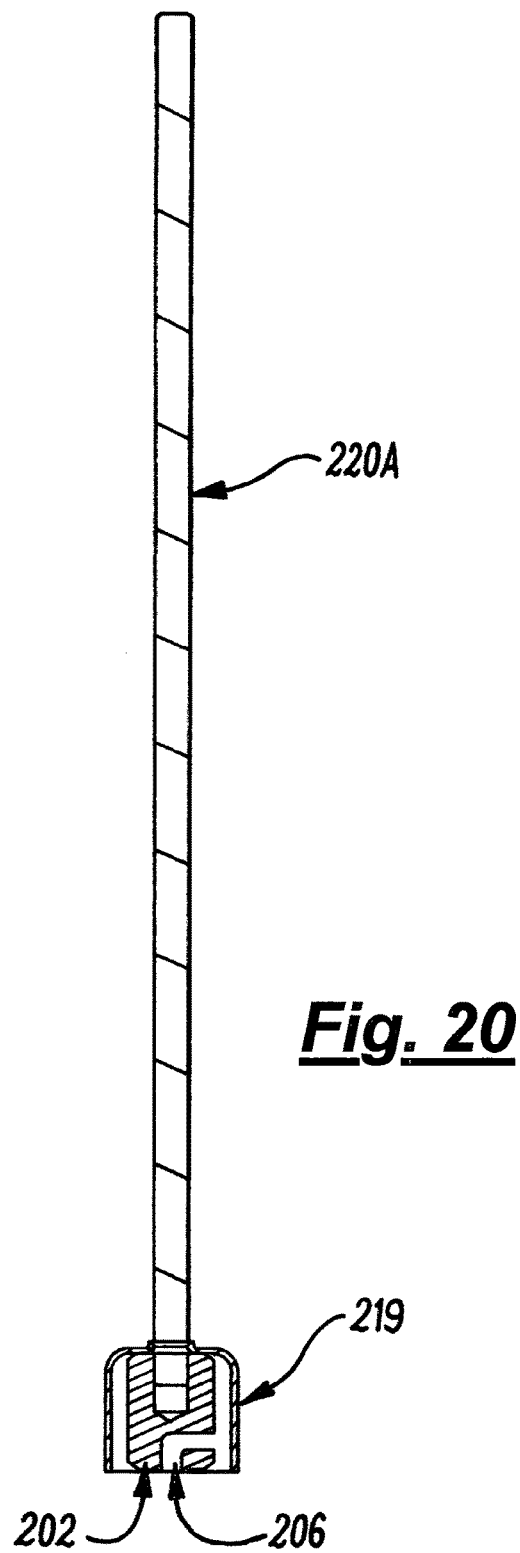
FIG. 20 is a sectional view of a modification of the drive transmission device shown in FIG. 19.

FIGS. 19 and 20 show a modified version of the second embodiment of the drive transmission arrangement 202, in which the connecting member 220 is replaced by a long connecting member 220A to allow the user drive the to reach inaccessible places and to avoid continually bending down, and thereby providing health benefits to the user. FIG. 19 shows the drive transmission device 202 without the sleeve 219. FIG. 20 shows the drive transmission device 202 having the sleeve 219. In use, the drive transmission device 202 is connected by means of the connecting member 220 to a drill in a manner that would be understood by those skilled in the art. The securing device 10 is mounted thereon by inserting the mounting member 24 into the recess 206 of the receiving portion 204, so that the receiving portion is received by, and extends through, the engaging portion 22.

The mounting member 24 is positioned in the support region 206B of the recess 206 to be supported by the support surface 218. This allows the user to position the securing device 10 in the desired location simply by moving the drill tool as appropriate, and without any need for the securing 10 to be held in the user's hand.

While so mounted on the drive transmission device 202, the securing portion 20 is disposed against the matting to be secured to the ground. The user then operates the drill, thereby rotating the force transmission device 202 so that force transmission device 202 is in a driving position relative to the securing pin. In this position, the force applying wall 208 is moved into engagement with the mounting member 24.

Continued rotation of the force transmission device 202 rotates the securing device 10 about the main shaft portion 14. By pressing down on the drill, the user moves the drill towards the ground as the securing device 10 is screwed into the ground.

When the end face 212 of the drive transmission device 202 engages the matting, the continued rotation of the securing device 10 by the drill screws the securing device 10 further into the ground, which causes the mounting member 24 to move along the main region 206A and the engaging portion 22 to move along the receiving portion 204.

Continued rotation of the drive transmission device 202 by the drill moves the mounting member out of the recess 206 via the end opening 210. Thus, the embodiment shown in FIGS. 9 to 20 provides the advantage that the securing device 10 is driven into the ground until it tightly engages the matting and is released automatically form the drive transmission arrangement when such tight engagement occurs.

There is thus described a securing device 10 that can be used to secure geotextile matting 100 to ground 101 susceptible to erosion. The embodiment of the securing device 10 described herein provides the advantage that it is not easily removed from the ground 101, requiring a greater force than prior art securing pins to do so. In addition, the use of the embodiments of the drive transmission arrangements described above provide the advantage that the securing device 10 is driven into the ground until the engaging portion 22 is flush with the surface of the ground.

Various modifications can be made without departing from the scope of the invention.

FIG. 21 shows a securing device 250, which has all the features of the securing device 10 described above. A holding member, in the form of an axially extending member 252, is provided on the securing device 250. The axially extending member 252 is provided on the engaging portion 22 and extends alongside the shaft portion 14, substantially parallel therewith. The axially extending member 252 is formed integrally with the engaging portion 22 and thereby integrally with the securing device 250.

FIG. 22 shows the securing device 250 in use to secure a lower region 226 of fencing 228. The fencing 228 is supported by posts 220. The lower region 226 extends substantially flat along the ground. The fencing 228 is formed of wires 222 which extend in a grid formation.

In FIGS. 21 and 22, the securing devices 250 are driven into the ground so that some of the wires 222 are held between the axially extending member 252 and the shaft portion 14. In FIG. 21, one of the wires 222 is shown in broken lines.

Figure 24:
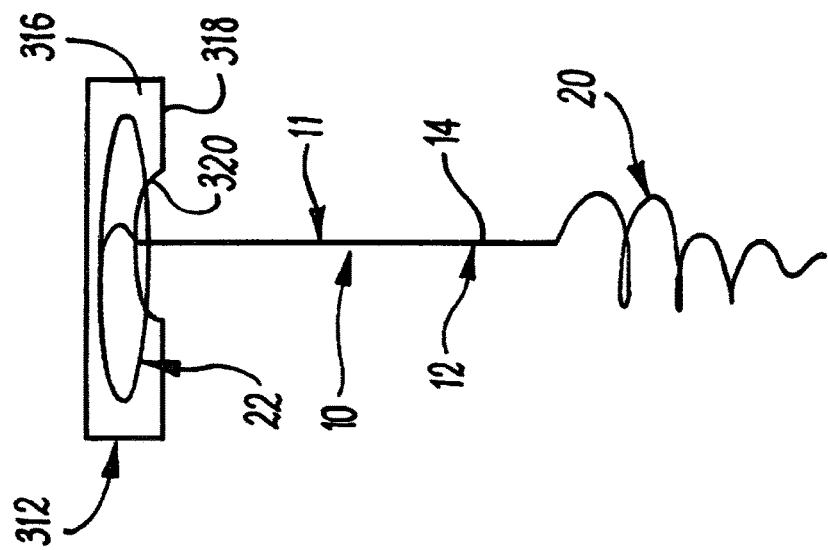
FIG. 24 is a side view of a further embodiment of a securing device incorporating the holding device shown in FIG. 23.
Figure 23:
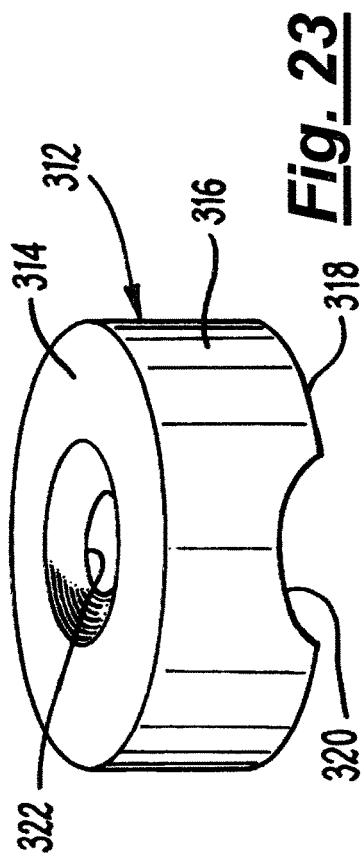
FIG. 23 shows a holding device forming part of an embodiment of the securing device.
Figure 25:
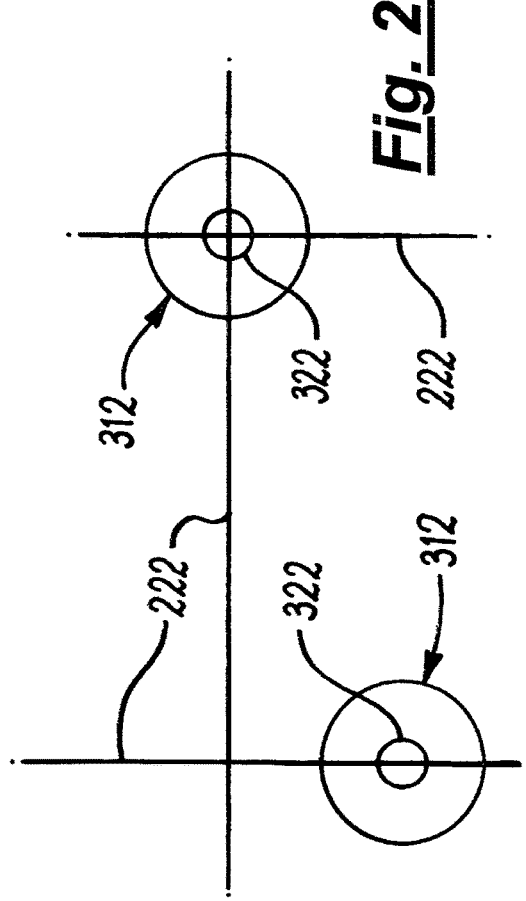
FIG. 25 is a bottom plan view of the holding device shown in FIG. 23 in use.

FIGS. 23, 24 and 25 show the securing device 10 in use with a holding device, generally designated 312. The holding device 312 comprises a first portion in the form of a substantially circular cover portion 314 and a downwardly extending substantially cylindrical skirt portion 316 attached to the outer edge of the cover portion 314. The skirt portion 316 has a lower edge 318 defining a plurality of recesses 320. The cover portion 314 defines a central aperture 322 through which the shaft portion 14 of the securing device 10 extends in use.

As shown in FIG. 25, the holding device 312 can be arranged at a junction of two of the wires 222 forming part of the lower region 226 of the fencing 228, or along one of the wires 222. In each case, the holding device 312 is arranged so that the recesses 320 are disposed over the wires to avoid damaging them.

In order to install the securing device 10, the holding device 312 is first arranged over the respective wire or wires 222, as described above. The securing device 10 is then inserted through the aperture 322 by screwing the securing portion 20 through the aperture 322 and then into the ground beneath. The securing device 10 is then screwed into the ground until the engaging portion 22 engages the cover portion 314. The engagement of the engaging portion 22 with the cover portion 314 secures the holding device 312 onto the ground, thereby securing to the ground the wire or wires 222 received through the recesses 320.

FIGS. 26 and 27 show an indicating arrangement 330 comprising a securing device 10 and an indicating device 332 in the form of a boundary marker or a surveying marker. The securing device 10 secures the indicating device 332 to the ground.

The indicating device 332 is in the form of a cup having a base portion 334 defining an aperture 336 through which the shaft portion 14 extends. A substantially cylindrical projecting portion 338 is attached to the base portion 334. The securing device 10 can be screwed through the aperture 336 into the ground in the same way in which the securing device 10 is screwed through the aperture 322 as described above. The engaging portion 22 engages the base portion 334 and thereby secures the indicating device 332 to the ground.

When so secured, the projecting portion 338 projects from the ground to provide a suitable indicator for the user. The projection portion may be of a suitably high visibility colour.

Figure 30:
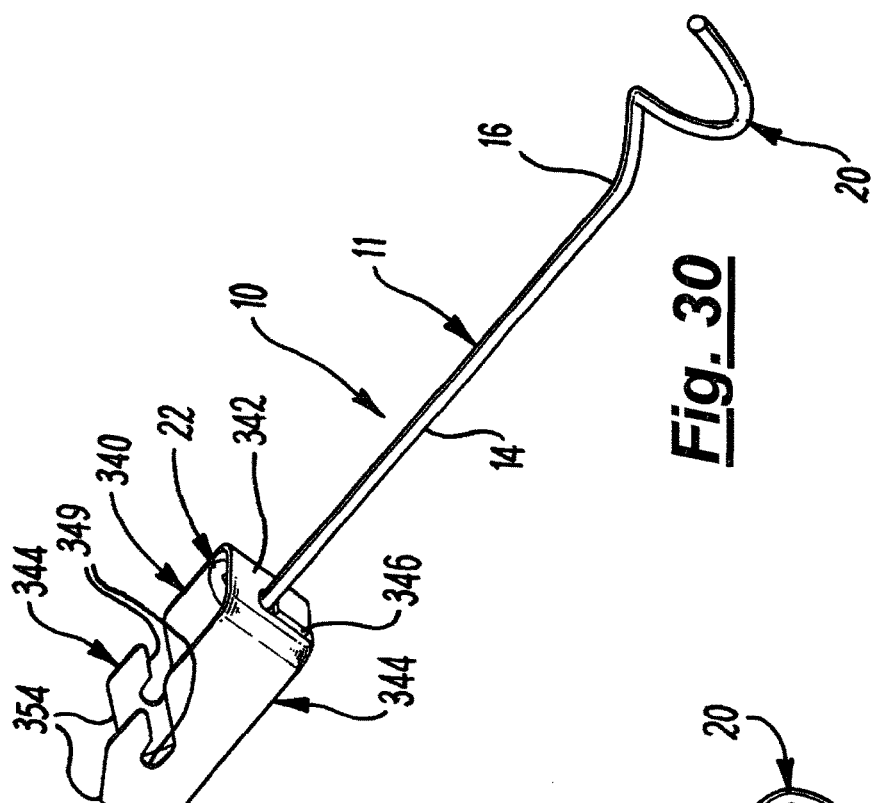
FIG. 30 is a bottom perspective view of the securing arrangement shown in FIG. 28.
Figure 29:
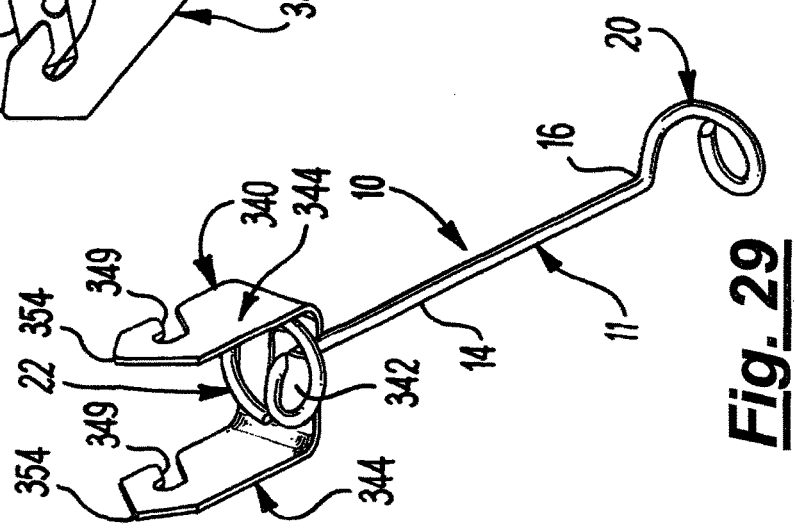
FIG. 29 is a top perspective view of the securing arrangement shown in FIG. 28.
Figure 28:
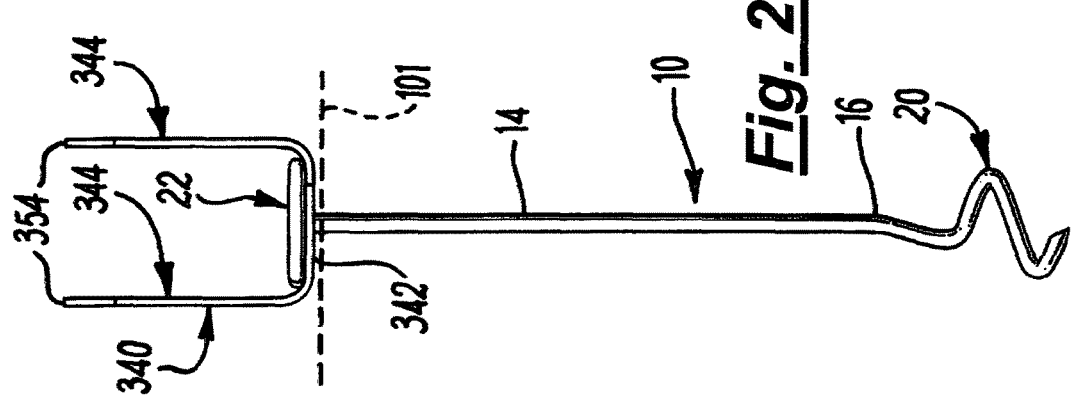
FIG. 28 is a side view of a securing arrangement comprising the securing device shown in FIG. 1 and a further holding device in a first orientation.
Figure 33:
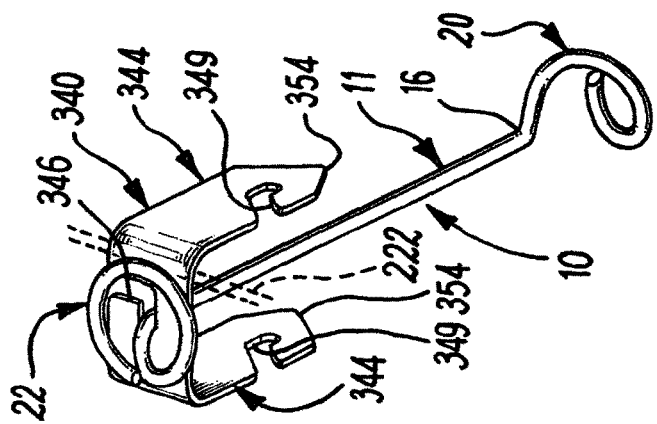
FIG. 33 is a bottom perspective view of the securing arrangement shown in FIG. 31.
Figure 32:
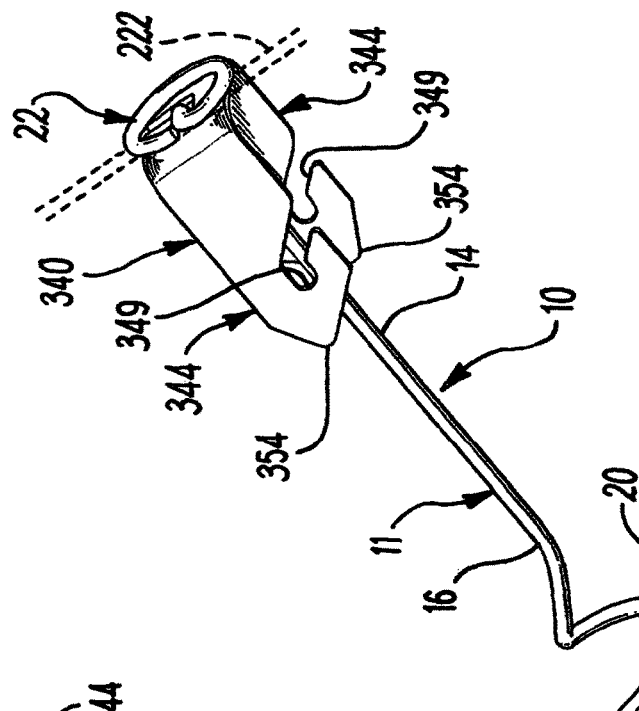
FIG. 32 is a side perspective view of the securing arrangement shown in FIG. 31.
Figure 31:
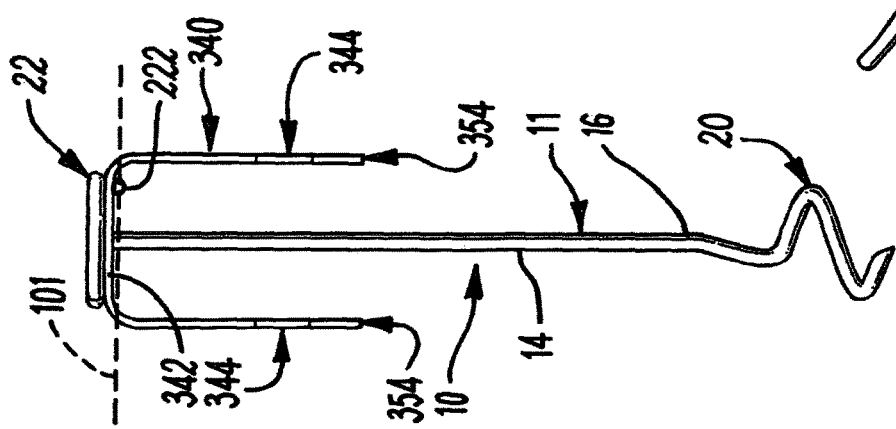
FIG. 31 is a side view of the securing arrangement shown in FIG. 28 in which the further holding device is in a second orientation.

FIGS. 28 to 33 show a securing device 10 and a holding device 340. FIGS. 28 to 30 show the holding device 340 in use in a first orientation. FIGS. 31 to 33 show the holding device 340 in use in a second orientation.

Figure 34:
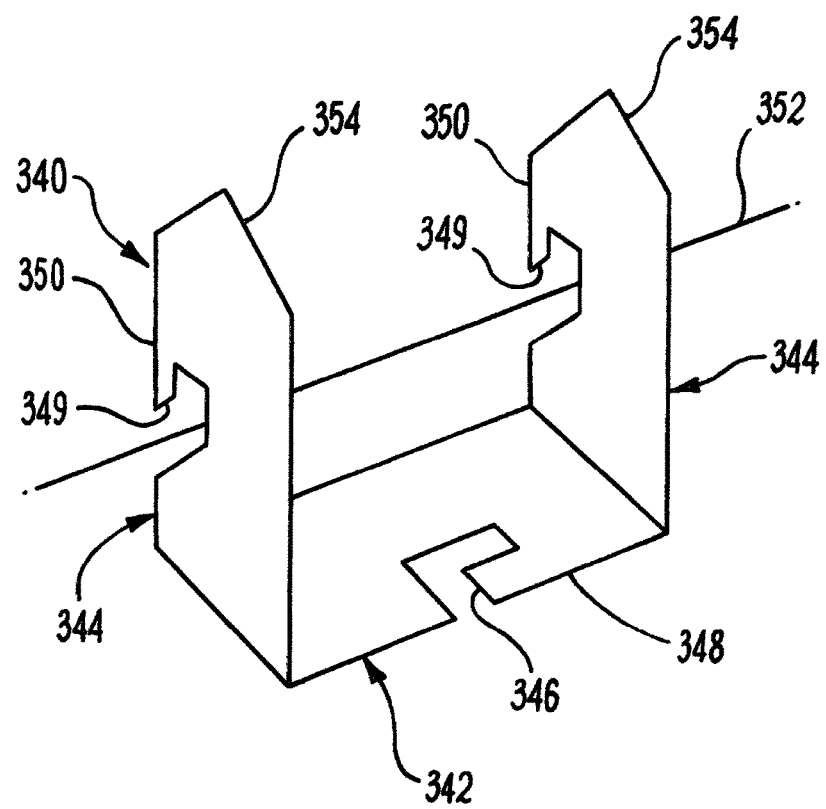
FIG. 34 shows the further holding device shown in FIGS. 28 to 33.

The holding device 340 is shown more clearly in FIG. 34 and comprises a substantially flat first portion 342. A pair of second portions 344 extend from the first portion 342. The second portions 344 extend from the first portion 342 in the same direction as each other, and are disposed at right angles to the first portion 342.

The first portion 342 is substantially flat and has a first formation in the form of a substantially 'L' shaped first slot 346 defined by the first portion 342. The first slot 346 extends inwardly of the first portion 342 from an edge 348 thereof. As explained below, the first slot 346 receives the shaft portion 14 of the securing device 10, so that the securing device 10 can extend through the first portion 342 to clamp the first portion 342 and, therefore the holding device 340, to the ground in either the first orientation or the second orientation.

Each second portion 344 is also substantially flat has a second formation in the form of a second slot 349 defined by the second portion 344. The second slot 349 extends inwardly of the second portion 344 from an edge 350 thereof. Each second slot 349 extends upwardly (as viewed when the holding device 340 is in the first orientation) from the edge 350 and has a dogleg shape.

Each second slot 349 can receive therethrough an elongate article 352 in the form of a fence wire when the holding device 340 is in the first orientation shown in FIGS. 28 to 30. Each second slot 349 is defined in the respective second portion 344 a predetermined distance from the first portion 342. Therefore, when the holding device 340 is clamped to the ground in the first orientation shown in FIGS. 28 to 30, the elongate article 352 is held a predetermined distance above the ground.

Each second portion 344 has a ground piercing formation in the form of an inwardly tapered free end 354. Each tapered free end provides a point to facilitate inserting the second portions 344 into the ground when the holding device is in the second orientation shown in FIGS. 31 to 33, as also explained below.

In FIGS. 28 to 30, the holding device 340 is shown in a first orientation. The securing device 10 is arranged to extend through the first portion 342 by passing the shaft portion 14 into the first slot 346 via the edge 348. The securing device 10 is then screwed into the ground 101 as described above.

When the holding device 340 is in the first orientation, the second portions 344 project upwardly from the ground 101, as shown in FIG. 28, and the engaging portion 22 of the securing device 10 is disposed between the second portions 344. The elongate article 352 can then be received in the second slots 349, thereby ensuring that the elongate article 352 is held the predetermined distance above the ground.

Referring to FIGS. 31 to 33, the holding device 340 is shown in the second orientation. The securing device 10 is arranged to extend through the first portion 342 by passing the shaft portion 14 into the first slot 346 via the edge 348, but the engaging portion 22 is disposed on the opposite side of the first portion 342 compared to the position of the engaging portion 22 when the holding device 340 is in the first orientation.

When the holding device 340 is in the second orientation, the second portions 344 are driven into the ground 101 when the securing device 10 is screwed into the ground 101. Thus, the holding device 340 can be arranged so that one of the wires 222 can be clamped between the first portion 342 and the ground 101 (see FIG. 31), thereby securing the wire 222 in place.

Figure 35:
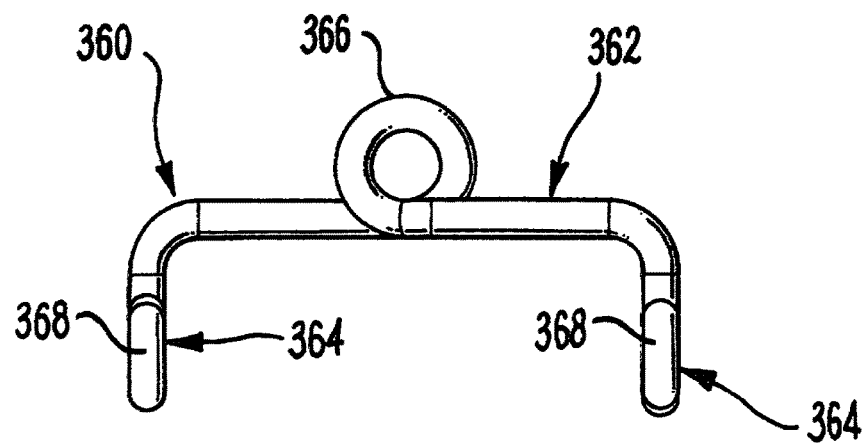
FIG. 35 shows a top plan view of another embodiment of the further holding device.
Figure 36:
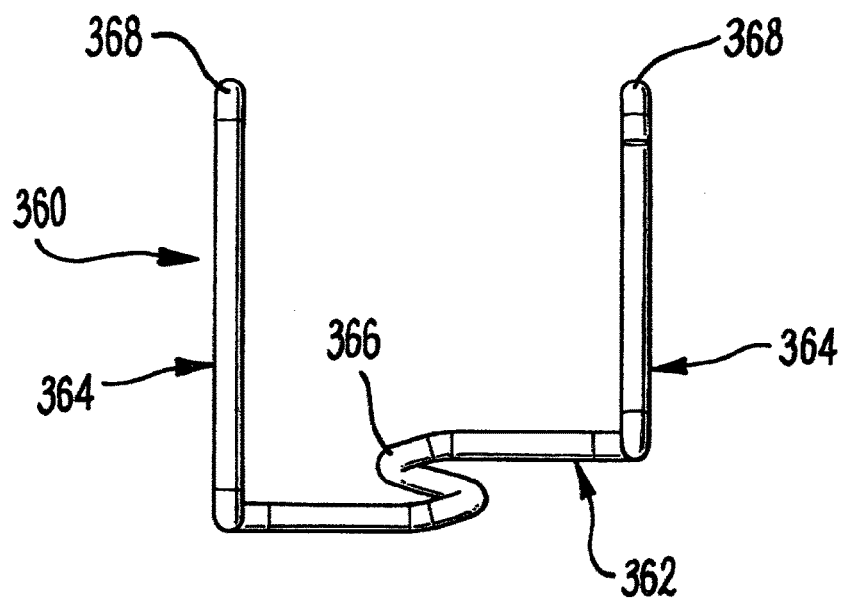
FIG. 36 is a front view of the embodiment of the further holding device shown in FIG. 35.

FIGS. 35 and 36 show another embodiment of the holding device, generally designated 360, which is formed of an elongate article, such as a wire. The holding device 360 can be used in first or second orientations, similar to the holding device 340 described above.

The holding device 360 shown in FIGS. 35 and 36 comprises a first portion 362. A pair of second portions 364 extend from the first portion 362. The second portions 364 extend from the first portion 362 in the same direction as each other, and are disposed at right angles to the first portion 362.

Figure 37:
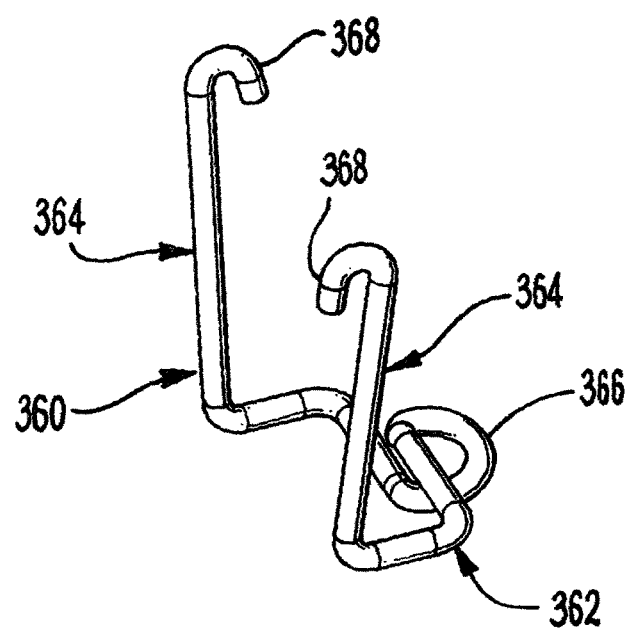
FIG. 37 is a perspective view of the embodiment of the further holding device shown in FIG. 35.

The first portion 362 includes a first formation in the form of a spiral region 366 through which the shaft portion 14 of the securing device 10 can be received. Each second portion 364 has a hook portion 368 at its free end for holding an elongate article, which may be a fence wire 352 (shown in broken lines in FIG. 38). The hook formations 368 extend from the second portions in opposite directions, as shown in FIG. 37, to help prevent the elongate article from being dislodged from the hook formations 368.

Figure 38:
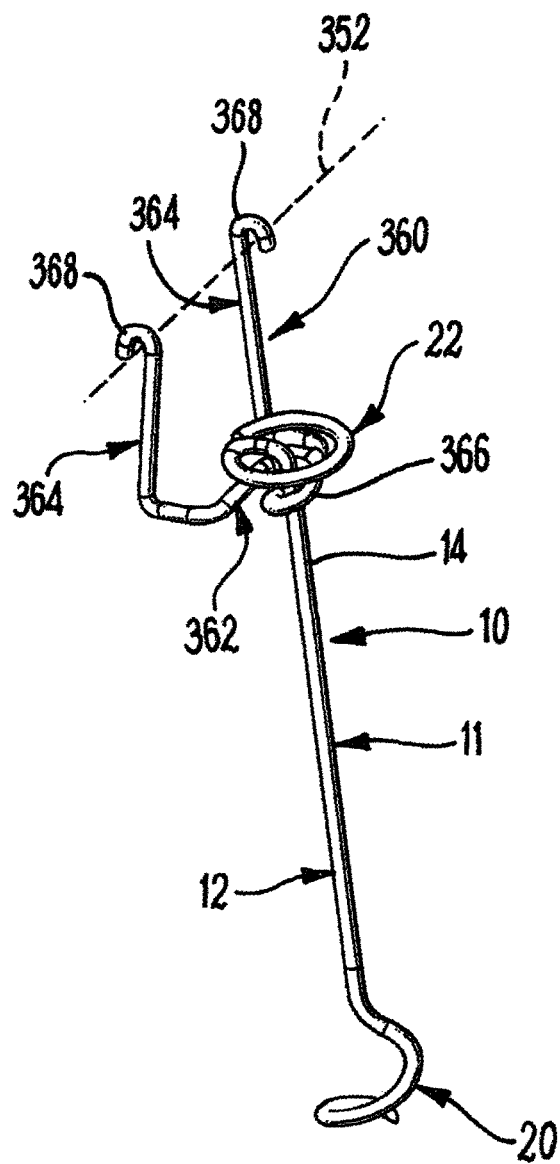
FIG. 38 shows the further holding device of FIGS. 35 to 37 in use in a first orientation.

When the holding device 360 is in the first orientation, shown in FIG. 38, the securing device 10 is arranged so that the shaft 14 extends through the spiral region 366. When the securing portion 20 is screwed into the ground, the engaging portion 22 clamps the spiral region 366 to the ground, thereby clamping the holding device 260 to the ground. The second portions 364 extending upwardly from the engaging portion 22. The fence wire 352 can then be received in the hook formations 368. The fence wire 352 is thus held at a predetermined distance above the ground.

Figure 39:
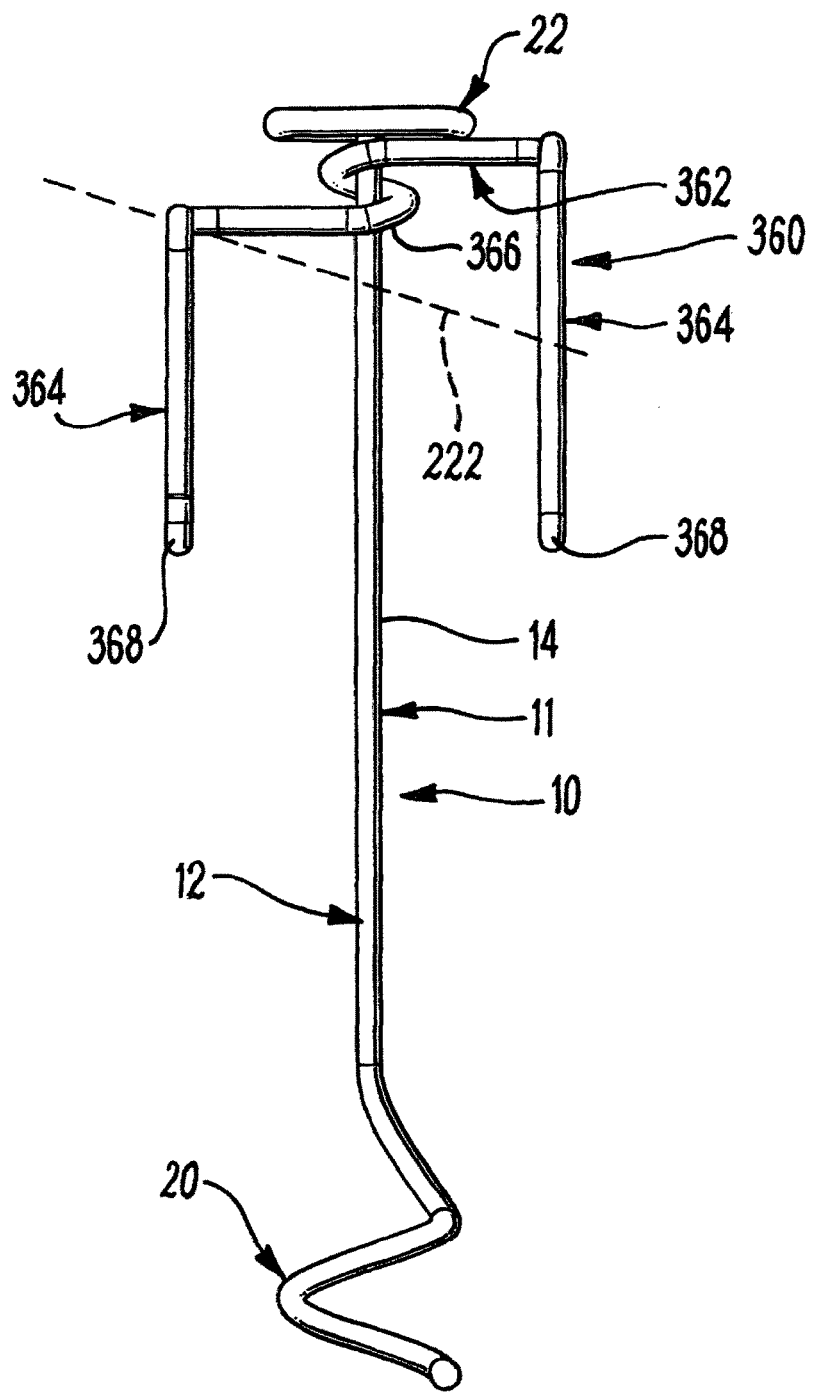
FIG. 39 shows the further holding device of FIGS. 35 to 37 in use in a second orientation.

When the holding device 360 is in the second orientation, shown in FIG. 39, it can be used to clamp the lower region of a fence to the ground, such as a fence wire 222 of the lower region 226 of the fence 228 shown in FIG. 22. The fence wire 222 is shown schematically in FIG. 39 in broken lines. The second portions 364 are inserted into the ground in a position so that one of the wires 222 is received between the second portions 364.

The securing device 10 is arranged through the spiral region 366 and screwed into the ground as described above. The engaging portion 22 clamps the spiral region 366 to the ground with the second portions 364 driven into the ground by the securing device 10. The first portion 362 is clamped onto the wire 222 to secure the lower region 226 of the fence 228 to the ground.

The invention claimed is:

1. A securing device for securing an article, the securing device comprising:
   a main shaft portion having proximal and distal opposite ends;
   a securing portion on the main shaft portion at the distal end of thereof;
   an engaging portion at the proximal end of the main shaft portion, the engaging portion comprising a substantially circular member for engaging the article; and
   a mounting member for mounting the securing device on a driving arrangement to drive the securing device, the mounting member extending inwardly of the substantially circular member and being in the form of a connecting member connecting the engaging portion to the main shaft portion;
   wherein the securing portion is a substantially helical elongate portion defining an unoccupied a central space;
   and wherein the engaging portion is substantially planar, and the main shaft portion extends transverse to the plane of the engaging portion.

2. A securing device according to claim 1, wherein the mounting member comprise a substantially straight member.

3. A securing device according to claim 1, wherein the engaging portion is a substantially planar, and wherein the mounting member is substantially coplanar with the engaging portion.

4. A securing arrangement comprising a securing device as claimed in claim 1 and a holding device for holding the article to the ground, the holding device comprising a first portion defining an aperture through which the main shaft portion can extend.

5. A securing arrangement according to claim 4, wherein the securing device comprises an engaging portion to engage the holding device, the engaging portion being provided on the main shaft portion, and wherein the holding device further includes a second portion extending from the first portion.

6. A securing arrangement according to claim 5, wherein the second portion comprises a skirt element, the skirt element having a free edge, said free edge defining at least one recess configured to extend over a part of the article in use.

7. A securing arrangement according to claim 6, wherein the free edge of the skirt element defines a plurality of recesses spaced from one another around the skirt element, each being configured to extend across a respective part of the article.

8. A securing arrangement according to claim 5, wherein the holding device comprises two of the aforesaid second portions provided opposite each other on the first portion, the first portion extending between the two second portions.

9. A securing arrangement according to claim 8, wherein the aperture is a first slot defined by the first portion.

10. A securing arrangement according to claim 9, wherein the first slot is substantially shaped, and extends from an edge of the first portion to allow the main shaft portion to be received therein via said edge.

11. A securing arrangement according to claim 8, wherein the first portion is substantially flat, and the securing device can extend through the first portion to hold the holding device on the ground.

12. A securing arrangement according to claim 8, wherein each second portion is substantially flat, and each second portion comprises a second formation in which the article can be received thereby holding the article at a desired distance from the ground in a first orientation of the holding device.

13. A securing arrangement according to claim 12, wherein each second formation is a second slot defined by the respective second portion each second slot extending from an edge of the respective second portion.

14. A securing arrangement according to claim 13, wherein each second portion has a free end, and each second slot extends from said edge towards a free end of the second portion, whereby when the holding device is in the first orientation, the securing device can secure the holding device to the ground in a position so that the second portion extends upwardly from the ground.

15. A securing arrangement according to claim 12, wherein each second portion comprises a ground piercing formation and each second portion can be inserted into the ground in a second orientation of the holding device, whereby when the holding device is in the second orientation, the securing device can secure the holding device to the ground in a position so that each second portion extends into the ground, and the first portion can engage the article between the first portion and the ground.

16. A securing arrangement according to claim 8, wherein the first portion is formed of an elongate member deformed into a spiral region through which the main shaft portion of the securing device can extend, the spiral region comprising a wound region of the first portion.

17. A securing arrangement according to claim 7, wherein each second portion has a free end, and each second portion includes a hook formation at the free end thereof for receiving the article, thereby holding the article at said desired distance from the ground.

18. An indicating arrangement comprising a securing device as claimed in claim 1 and an indicating device, the indicating device defining an aperture through which the securing device can extend.

19. A securing arrangement comprising a securing device as claimed in claim 1 and a drive transmission device for transmitting a driving force from a driving arrangement to the securing device.

20. A method of using a securing device as claimed in claim 1, said method comprising inserting the securing portion through an article on the ground, and driving the securing device into the ground by rotating the securing device about the main shaft portion.

21. A method according to claim 20, comprising providing a drive transmission device, and the method includes mounting the securing device on the transmission device.

22. A drive transmission device for transmitting a driving force from a driving tool to a securing device as claimed in claim 1, said drive transmission device comprising a connecting member for connecting the drive transmission device to the driving tool and a receiving portion for receiving at least part of the securing device.

* * * * *